(12) United States Patent
Ng et al.

(10) Patent No.: US 10,353,535 B2
(45) Date of Patent: Jul. 16, 2019

(54) MULTI-VIEW DISPLAY VIEWING ZONE LAYOUT AND CONTENT ASSIGNMENT

(71) Applicant: Misapplied Sciences, Inc., Redmond, WA (US)

(72) Inventors: Albert Han Ng, Redmond, WA (US); Paul Henry Dietz, Redmond, WA (US); David Steven Thompson, Redmond, WA (US)

(73) Assignee: MISAPPLIED SCIENCES, INC., Redmond, WA (US)

( * ) Notice: Subject to any disclaimer, the term of this patent is extended or adjusted under 35 U.S.C. 154(b) by 375 days.

(21) Appl. No.: 15/299,805

(22) Filed: Oct. 21, 2016

(65) Prior Publication Data

US 2018/0113593 A1    Apr. 26, 2018

(51) Int. Cl.
| | | |
|---|---|---|
| *G06F 3/048* | (2013.01) | |
| *G06F 3/0481* | (2013.01) | |
| *G06F 3/0484* | (2013.01) | |
| *H04N 13/117* | (2018.01) | |
| *H04N 13/351* | (2018.01) | |
| *H04N 13/30* | (2018.01) | |

(52) U.S. Cl.
CPC ...... *G06F 3/04815* (2013.01); *G06F 3/04842* (2013.01); *G06F 3/04845* (2013.01); *H04N 13/117* (2018.05); *H04N 13/351* (2018.05); *H04N 2013/403* (2018.05)

(58) Field of Classification Search
CPC ............... G06F 3/0481; H04N 13/128; H04N 21/4312; G09G 3/003; G06T 15/405
See application file for complete search history.

(56) References Cited

U.S. PATENT DOCUMENTS

| | | | |
|---|---|---|---|
| 7,462,104 B2 | 12/2008 | Di Cesare | |
| 8,461,995 B1 | 6/2013 | Thornton | |
| 9,998,733 B2 * | 6/2018 | Effendi | ................ H04N 13/128 |
| 2003/0115096 A1 | 6/2003 | Reynolds et al. | |
| 2005/0093986 A1 | 5/2005 | Shinohara et al. | |
| 2009/0109126 A1 | 4/2009 | Stevenson et al. | |
| 2011/0159929 A1 * | 6/2011 | Karaoguz | .......... H04N 21/4312 |
| | | | 455/566 |
| 2012/0140048 A1 | 6/2012 | Levine | |
| 2015/0092026 A1 | 4/2015 | Baik et al. | |
| 2015/0279321 A1 | 10/2015 | Falconer et al. | |

(Continued)

*Primary Examiner* — Haoshian Shih
(74) *Attorney, Agent, or Firm* — K&L Gates LLP

(57) ABSTRACT

Systems and methods are described for managing a multi-view display, including user interface techniques for manipulating viewing zone information and assigning content to viewing zones in the context of the viewing area. The multi-view display system may be calibrated to a coordinate system of the viewing area. The coordinate system can be based on the physical dimensions of the viewing area, a model or other representation of the viewing area, and/or characteristics detected by a sensing system observing the viewing area. A zone management device provide a user interface showing a representation of the viewing area along with representations of established viewing zones rendered in context within the viewing area. User interface elements allow a user to add, remove, manipulate, configure viewing zones, and/or assign content to viewing zones. User interface elements can also allow a user to manipulate the representation of the viewing area.

21 Claims, 13 Drawing Sheets

(56) References Cited

U.S. PATENT DOCUMENTS

| | | |
|---|---|---|
| 2015/0365647 A1* | 12/2015 | Coming .............. G06T 15/405 345/422 |
| 2016/0210100 A1 | 7/2016 | Ng et al. |
| 2016/0212417 A1 | 7/2016 | Ng et al. |
| 2016/0224122 A1 | 8/2016 | Dietz et al. |
| 2016/0227201 A1 | 8/2016 | Ng et al. |
| 2016/0293003 A1 | 10/2016 | Ng et al. |
| 2016/0379394 A1* | 12/2016 | Kim .................... G09G 3/003 345/629 |
| 2017/0205889 A1 | 7/2017 | Ng et al. |

* cited by examiner

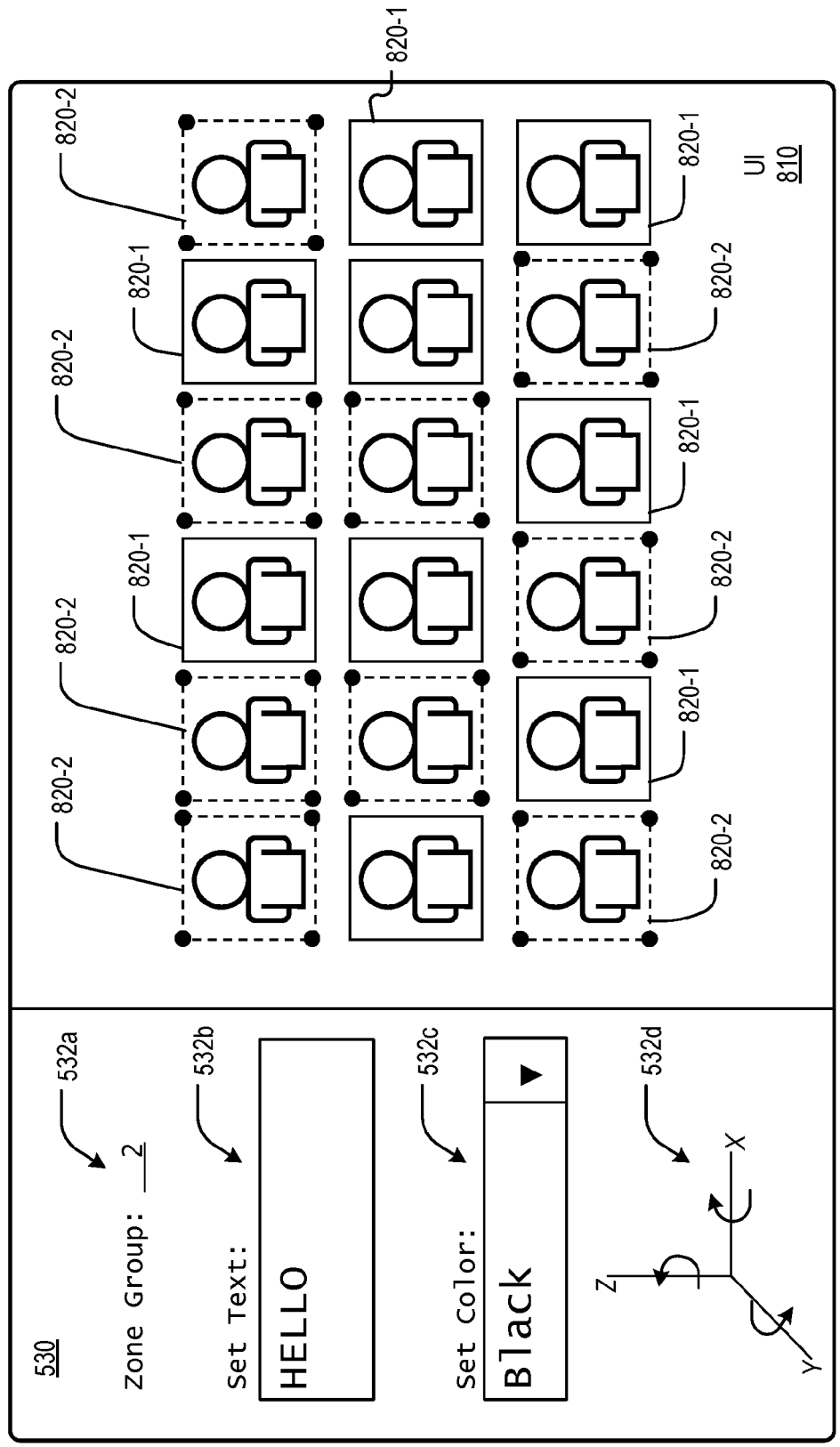

MULTI-VIEW DISPLAY VIEWING ZONE LAYOUT AND CONTENT ASSIGNMENT

FIELD

This application relates to electronic displays.

BACKGROUND

A typical electronic display, such as an LCD, LED, or plasma display, shows a single image at a time to all viewable locations of the display. In an environment shared by multiple viewers, each viewer simultaneously sees the same image on the display. As a result, the image on the display cannot be simultaneously customized to multiple viewers of the display. Content is either selected to be suitable to all viewers, or customized to a subset of viewers at the expense of being less relevant to the remainder of viewers.

Multi-view displays, on the other hand, may comprise projection elements that can each controllably shine light of different color and brightness in many different directions. This allows multiple viewers in the same shared viewing environment to each see different content simultaneously on the same display. With such a display, content can be customized for each individual viewer, for display at the same time and on the same shared display.

The multi-view functionality, while allowing different experiences for different viewers or viewing zones, makes the display more challenging for a user to manage than a traditional single-view display, in which only a single image is displayed at any time.

SUMMARY

Systems and methods are described for managing a multi-view display, including user interface techniques for manipulating viewing zone information and assigning content to viewing zones in the context of the viewing area. The multi-view display system may be calibrated to a coordinate system of the viewing area. The coordinate system can be based on the physical dimensions of the viewing area, a model or other representation of the viewing area, and/or characteristics detected by a sensing system observing the viewing area. A zone management device comprising a display, processor, and input device can be used to present the user interface for managing the multi-view display. The user interface may show a representation of the viewing area along with representations of established viewing zones rendered in context within the viewing area. User interface elements allow a user to add, remove, manipulate, configure viewing zones, and/or assign content to viewing zones. User interface elements can also allow a user to manipulate the representation of the viewing area.

In accordance with embodiments of the present invention, a method of assigning content for display by a multi-view display in a three-dimensional space is provided. The method comprises: displaying on a user interface of a computing device a representation of the three-dimensional space; providing a zone management tool on the user interface for configuring a plurality of unique viewing zones in the three-dimensional space; providing a content assignment tool on the user interface for assigning visual content for display in each of the plurality of viewing zones; displaying on the multi-view display a first visual content visible to a first viewer positioned in a first viewing zone of the plurality of viewing zones, but not visible to a second viewer positioned in a second viewing zone of the plurality of viewing zones; and displaying on the multi-view display a second visual content visible to the second viewer positioned in the second viewing zone, but not visible to the first viewer positioned in the first viewing zone.

Still other embodiments of the present invention will become readily apparent to those skilled in the art from the following detailed description, which describes embodiments illustrating various examples of the invention. As will be realized, the invention is capable of other and different embodiments and its several details are capable of modifications in various respects, all without departing from the spirit and the scope of the present invention.

BRIEF DESCRIPTION OF DRAWINGS

FIG. 8 depicts a user interface for assigning content to viewing zone groups, in accordance with embodiments of the present invention.

DETAILED DESCRIPTION

In the following description, reference is made to the accompanying drawings that illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

Various embodiments of the present disclosure provide improved systems and methods for managing a multi-view display, including user interface techniques for visualizing a viewing environment, manipulating viewing zone information, and assigning content to viewing zones in the context of the viewing environment.

A typical display, such as an LCD, LED, or plasma display, shows a single image at a time to everyone viewing the display. In an environment shared by multiple viewers, each viewer simultaneously sees the same image on the display. As a result, the image on the display cannot be simultaneously customized to multiple viewers of the display. Content must either be selected that is suited to all viewers, or customized to a subset of viewers at the expense of being less relevant to the remainder of viewers.

MV displays, on the other hand, can display different content simultaneously by targeting the display of content to particular users or locations within view of the MV display. The MV display may comprise, e.g., projection elements that can each controllably shine light of different color and brightness in many different directions. This allows multiple viewers in the same shared viewing environment to each see different content simultaneously on the same display. With such a display, content can be customized for each individual viewer, at the same time, and on the same shared display.

The multi-view functionality, while allowing different experiences for different viewers or viewing zones, makes the display more challenging for a user to control than a traditional single-view display. In addition to designing content for a display, a user must specify viewing zones and assign content to each viewing zone within the viewing area of the display. Therefore, a more effective user interface to lay out viewing zones and assign content to viewing zones for multi-view displays is desired.

Figure 1:
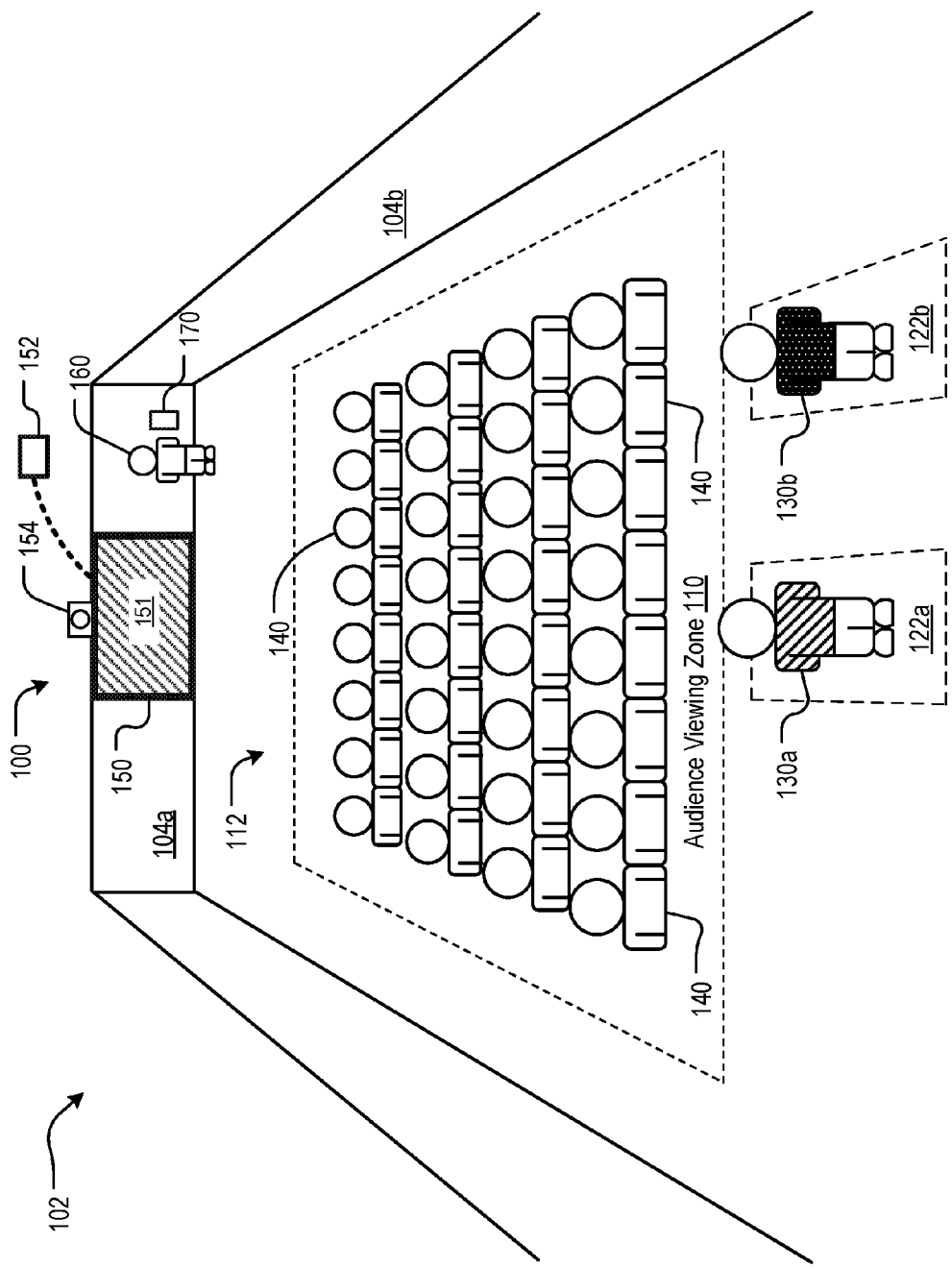
FIG. 1 illustrates an example installation of a multi-view (MV) display system with assignable content for different viewing zones in a shared viewing environment, in accordance with embodiments of the present invention.

FIG. 1 illustrates an example installation of a multi-view (MV) display system with assignable content for different viewing zones in a shared viewing environment, in accordance with embodiments of the present disclosure. In the illustrated example, the MV display system 100 includes a system controller 152 operatively coupled to an MV display 150 positioned on the front wall 104a of a viewing environment 102 (e.g., a room). This MV display 150 includes a viewing surface 151 and is configured to display differentiated content to viewers within the viewing environment 102. In the illustrated embodiment, the system 100 is implemented inside of a viewing environment 102 having a one or more different viewing areas to which differentiated content may be displayed. These viewing areas may include, e.g., a large spectator viewing zone 112 in which the audience members 140 may be seated to view content on the MV display 150, and/or additional viewing zones 122a-122b.

In accordance with embodiments of the present invention, a zone management device 170 may be used by, e.g., an administrator 160, to manage the various viewing zones in a viewing environment and content to be displayed to those viewing zones. The zone management device 170 may comprise any suitable computing device having a display and an input device, such as, for example, a touchscreen mobile phone, a touchscreen tablet computer, a smart watch, virtual reality (VR) goggles, augmented reality (AR) goggles, wearable computers, a laptop, or a desktop personal computer. As will be described in greater detail below, the administrator 160 may utilize a zone management tool on the user interface of the zone management device 170 to configure one or more unique viewing zones in the three-dimensional (3D) viewing environment and a content assignment tool on the user interface of the zone management device 170 to assign visual content for display to each of the viewing zones. The user interface of the zone management device 170 may display a representation of the viewing environment along with representations of established viewing zones rendered in context within the viewing environment. User interface elements allow a user to add, remove, manipulate, configure viewing zones, and/or assign content to viewing zones, and can also allow a user to manipulate the representation of the viewing area.

In accordance with some embodiments, the MV system 100 may optionally include a sensing system 154 that can be used to detect one or more characteristics of the 3D viewing environment. This may include the use of a spatial sensing system to generate a representation of the 3D space. This representation can then be used when configuring the viewing zones of the 3D space. In some embodiments, the characteristics of the viewing environment detected by the sensing system 154 may be used to determine the visual content to be displayed to the viewing zones. The representation may take the form of, for example, a map, point cloud, wire polygon mesh, textured polygon mesh, digital images, etc.

Described herein are embodiments of a system for managing the display of differentiated content to different viewing zones in a viewing environment. As described herein, the system may comprise an MV display and associated control, content, and sensing systems that can simultaneously present multiple versions of visual content that may vary by viewing location and may be used as a system with technologies and procedures that facilitate, e.g., calibration, content design, viewing location layout, tracking, sensing, and analysis.

One embodiment of an MV display 150 may contain one or more projection elements, or directional pixels, each of which may be controlled so as to selectively project light, different colors, and different brightness levels, in multiple directions. As a result, the appearance of each projection element or pixel may vary depending on the viewer's location relative to the MV display. For example, one person 130a observing the MV display 150 might see an illuminated pixel, while the same pixel might not appear illuminated to another person 130b simultaneously looking at the pixel from a different location. Alternatively, the pixel might appear blue to one person and simultaneously appear red to another person in a different location. An MV display may contain an array of these directional pixels, allowing the simultaneous projection of media that can be differentiated depending on viewing location. A similar functionality may be achieved by placing a lens or array of lenses over a display panel, giving each lens the capability of serving as a directional pixel or pixels presenting the different colors on the underlying display panel so that the light from each lens may have a different appearance depending on the viewer's location relative to the display. Other methods may also be used for transforming a conventional single color pixel into a directional pixel that has a different appearance depending on the angle/location from which it is viewed. These systems and others can be used in conjunction with a number of methods to display differentiated visual content that is specific to location, individual, and other variables.

Various embodiments of the present invention may combine one or more of the following elements: (1) a multi-view (MV) display system that may simultaneously present different versions of content that may vary depending on the location of the viewer relative to the MV display; (2)

calibration procedures that may aid in assigning the selection of colors and brightness levels to be displayed by each pixel and directing those pixels so as to form multiple versions of content that may each be projected to a designated viewing zone; (3) methods, technologies, and interfaces for designing content for multi-view systems that optimize the content for specific applications, conditions, users, and/or other criteria; (4) methods, technologies, and interfaces for laying out and revising viewing zones that may correlate viewer location with various versions of display content; (5) methods, technologies, and interfaces that may enable inputting and changing content for display; and (6) sensor-driven systems that may direct the targeting of viewers, the layout and updating of viewing zones, and the selection and updating of content based on the information detected about the environment or location of the MV system. Also included are categories and examples of applications that may be achieved with these technologies, systems, procedures, interfaces, tools, and/or methods.

Figure 2:
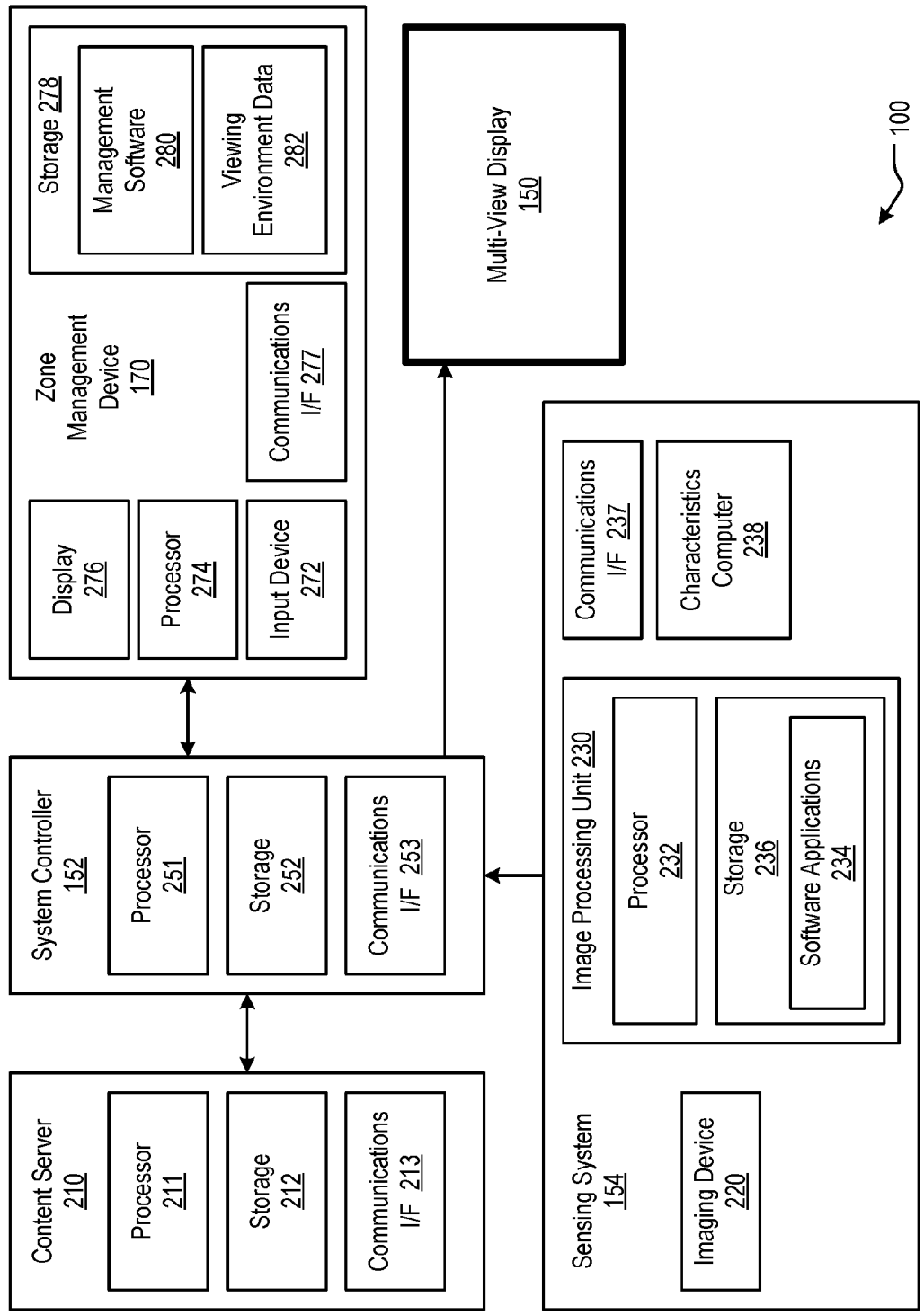
FIG. 2 is a block diagram of an MV system in accordance with embodiments of the present invention.

FIG. 2 is a block diagram of an MV system 100 in accordance with embodiments of the present invention. The MV system 100 comprises an MV display 150, a system controller 152, a sensing system 154, a zone management device 170, and a content server 210. In this embodiment, a viewer detection system is provided in sensing system 154, which may comprise a machine/computer vision system that captures images or videos of the scene in the detection space. The captured images/videos are then used to determine one or more characteristics of the viewing environment and the viewers positioned in the viewing environment.

The operation of the MV display 150 is managed via a system controller, such as system controller 152. The system controller 152 directs the operation of the MV display 150. For example, in some embodiments, system controller 152 will fetch content from content server 210 and then direct the operation of the MV display 150, causing the MV display 150 to display a specific image to a specific location in the viewing space. As depicted in FIG. 2, system controller 152 includes a processor 251, a non-transitory computer-readable storage 252 operatively coupled to the processor 251, and a communications interface 253. Communications interface 253 may be similar to communications interface 213 and may enable communications with content server 210 and other devices. Although the illustrative embodiment depicts a single controller 152, in some embodiments, the functionality of controller 152 is distributed among several devices.

A zone management device 170 may be used to manage the viewing zones and/or assign visual content assignment for display on the MV display 150, as will be described in greater detail below. As depicted in FIG. 2, zone management device 170 includes a processor 274, a non-transitory computer-readable storage 278 operatively coupled to the processor 274, a display 276, an input device 272, and a communications interface 277. Communications interface 277 may be similar to communications interface 253 and may enable communications with the system controller 152 and other devices. Although the illustrative embodiment depicts a single zone management device 170, in some embodiments, the functionality of the zone management device 170 is distributed among several computing devices.

The MV display 150 may be utilized in conjunction with conventional computer displays, screens, projections, and other media delivery technologies to provide more immersion, content, and context while retaining customization, personalization, and other benefits.

Sensing System.

In accordance with embodiments of the present invention, the MV display system 100 may include an optional sensing system to provide inputs to the control system. FIG. 2 includes a simplified block diagram of an exemplary sensing system 154. The sensing system 154 includes one or more imaging devices 220 for image acquisition, and an image processing unit 230 for performing various digital image processing techniques for extracting the desired information. Embodiments of sensing system 154 that include imaging device(s) 220 can provide information regarding the physical characteristics of the viewing environment, including the dimensions of the viewing environment and the location of viewer(s) with respect to MV display 150, in addition to providing viewer presence detection (and, in some embodiments, viewer characterization). It will be appreciated that in such embodiments, in addition to or as an alternative to the imaging device, other devices/techniques can be used for detecting the characteristics of the viewing environment (e.g., RF triangulation techniques, GPS, etc.).

The imaging device(s) 220 may include one or more digital cameras, including corresponding lenses and optional light sources that are designed, collectively, to provide the requisite differentiation for subsequent processing. In some embodiments, the digital camera may be a depth-aware camera, such as structured light or time-of-flight cameras, which can generate a depth map of what is being seen through the camera, wherein this data is then used to approximate a 3D representation of the image captured by the camera. In some other embodiments, the camera may be a stereoscopic camera, which utilizes two digital cameras whose relative positions are known to generate a 3D representation of the output of the cameras. In some further embodiments, one or more standard two-dimensional (2D) cameras are used for image acquisition. In some additional embodiments, the imaging device comprises a radar system. Those skilled in the art will know how to make and/or specify and use various cameras, radar, or other imaging devices for the purposes of presence detection/location determination. Sensing system 154 can employ conventional (2D visible light) imaging, although other techniques, such as imaging various infrared bands, line scan imaging, 3D imaging of surfaces, or other techniques may suitably be used. Those skilled in the art will know how to select and use an appropriate imaging technique in conjunction with embodiments of the invention.

In some embodiments, imaging device 220 is combined with image processing unit 230, which includes processor 232 running software applications 234 (such as, e.g., image processing software) stored in non-transitory computer-readable data storage 236. In some embodiments, imaging device 220 is physically separated from the image processing unit 230, the latter of which is implemented on a separate computer (not depicted) or on system controller 152 running appropriate image processing software.

Any of a number of image processing techniques may suitably be used, including, without limitation, stitching/registration, morphological filtering, thresholding, pixel counting, image segmentation, face detection, edge detection, blob discovery, and manipulation, to a name few.

Content Generation System.

Differentiated content may be generated for each viewing zone by a content generation system, which can be, e.g., embodied as content server 210. In some embodiments, some of the tasks involved in content generation are performed by sensing system 154.

Content server 210 may include a processor 211, a non-transitory computer-readable storage 212 operatively coupled to the processor 211, and a communications interface 213.

Processor 211 may be a general-purpose processor that is capable of, among other tasks, executing an operating system and executing application software used in conjunction with embodiments of the invention. Processor 211 is also capable of populating, updating, using, and managing data in data storage 212. In some alternative embodiments of the present invention, processor 211 is a special-purpose processor. It will be clear to those skilled in the art how to make and use processor 211.

Storage 212 may comprise a non-volatile, non-transitory, machine-readable memory (e.g., ROM, EPROM, EEPROM, hard drive(s), flash drive(s) or other solid state memory technology, CD-ROM, DVD, etc.) that stores data (such as pre-generated content) and application software, which, when executed, enable processor 211 to generate or select visual content for display on MV display 150. Instructions stored on the memory may embody any one or more of the methodologies or functions described herein. The instructions may also reside, completely or at least partially, within the main memory, within the processor 211 (e.g., within the processor's cache memory), or both, before or during execution thereof by the content server 210. The instructions may also reside in a static memory of the content server 210.

Accordingly, the main memory and the processor 211 of the content server 210 may also be considered machine-readable media (e.g., tangible and non-transitory machine-readable media). The instructions may be transmitted or received over a network via a communication interface, as described below.

Communications interface 213 enables communications with, for example and without limitation, system controller 152, and other computing devices on the Internet, such as to access news sites, social media sites, etc., via any appropriate medium, including wireline and/or wireless, and via any appropriate protocol (e.g., Bluetooth, Wi-Fi, cellular, optical, ultrasound, etc.). The term "communications interface" is meant to include any electronic communications technologies and, as appropriate, various supporting equipment, such as communications ports, antennas, etc. Visual content relating to the information received from other computing devices, such as news websites or social media websites, can then be selectively displayed to one or more viewers without being visible to other viewers.

Although the illustrative embodiment depicts a single content server 210, in some embodiments, the system 100 includes multiple content servers 210. Furthermore, in some embodiments, the functionality of content server 210 is distributed among other elements of the system 100, such as system controller 152.

Content generation includes selecting from (1) pre-generated content or (2) generating the content in real time. The pre-generated content may comprise, for example, text, images, videos, other graphical content (e.g., an icon, arrow, pointer, single light, multiple lights, colored lights, light or images projected at a predefined rate or pattern), and/or other content. The content generated in real time may include, for example, information about the audience or other event occurring in real time.

Content Presentation System.

After generating the visual content, that visual content is displayed to the various viewing areas in the viewing environment using the MV display 150 and the system controller 152. As described above, an MV display is capable of displaying different images to different viewers based on a difference in viewing location. In contrast, a traditional display, such as a conventional LCD, LED, plasma, or projection display, displays the same image to all viewers, while an MV display is capable of displaying different images to different viewers simultaneously.

The MV display 150 described above includes one or more projection elements that emit light of different color and brightness at different angles. Similarly, each projection element may simultaneously direct light in some directions, and show no light in other directions. In some embodiments, each projection element includes a light source, an imager, and a lens. The light source illuminates the imager and the imager filters or directs the light through the lens. The lens is capable of directing light that is received from different locations of the imager in different directions. Examples of suitable imagers include, without limitation, digital micro-mirror devices, liquid crystals, light emitting diodes, and/or liquid crystal on silicon (LCOS). The light source illuminates the imager and the imager filters or directs the light through the lens.

Each projection element can be considered to be a single multi-view pixel of the display, wherein a full graphic multi-view display is formed from an array of such projection elements. In some embodiments, each projection element is controlled by its own processor. In other embodiments, a processor controls plural projection elements, but fewer than all of the elements of the display. In some embodiments, all of such processors in the MV display are connected via a network (e.g., Ethernet, Infiniband, 1 2C, SPI, Wi-Fi, etc.), or, more generally, a communication channel (e.g., HDMI, etc.).

In some implementations of multi-view pixels, a multi-view pixel can be implemented using a projector similar to a conventional image projector. A conventional image projector projects a plurality of narrow light beams toward a projection screen. In contrast, a multi-view pixel is capable of controllably directing light (each controllable beam referred to herein as a "beamlet") in a plurality of directions. The color and brightness in different directions, corresponding to different beamlets, can be different. A multi-view pixel is similar to a conventional image projector in that it emits a number of beamlets, but the beamlets are not intended for forming an image on a screen. Rather, they are intended to fall upon the eyes of a viewer. Each multi-view pixel, from a viewer's perspective, appears to be a light source of the color and brightness of the beamlet that is projected by that pixel onto the viewer, even if the projection would be too dim for any image to be visible if projected onto a nearby surface. As a consequence, the appearance of each multi-view pixel from the perspective of a viewer is dependent upon the angle at which the viewer views it. In other embodiments, the multi-view pixels can be implemented using a plurality of lenses positioned over a display panel, with each lens operating as a single multi-view pixel. In other embodiments, any of a variety of technologies capable of achieving the desired effect of sending different visual information in different directions from the same pixel, or array of pixels, or display, may be used for the MV display.

In example multi-view displays, each projection element pixel has a projection space comprising a plurality of projection angles. A projection element may project a beamlet of a particular color and brightness at each discrete projection angle, and may project beamlets of different color and brightness at different projection angles. For example, in an embodiment utilizing traditional projectors, the viewing angles are quantized and defined by the pixels of the projector, and may be measured by the pixel coordinates.

It is noted that an MV display may comprise multi-view pixels not arranged in a regular rectangular array, similar to the arrangement of pixels in a traditional display. Multi-view displays can also be configured into many different shapes, forms, sizes, and configurations to better aid visibility to targeted viewers, concealment from others who are not targeted viewers, aesthetic appeal, functional impact, adaptation to the surrounding environment, and other considerations. Multi-view pixels can be arranged in non-traditional configurations, including, but not limited to, hexagonal arrays, non-uniform patterns, geometric shapes, and/or figure outlines. Multi-view pixels can also be arranged in non-planar configurations. For example, multi-view pixels can be configured to follow the contour of a surface, or an arbitrary 3D configuration. For example, directional pixels might be incorporated into organic shapes, such as, e.g., a rock face or tree trunk; into decorative elements, such as, e.g., murals or sculptures; around geometric shapes, such as, e.g., a sphere, oval, or ribbon; into architectural and landscape features, such as, e.g., walls, ceilings, floors, pools, fountains, furnishings, columns, steps, soffits, bollards, parapets, rooflines, and building outlines; or into traditional media forms such as, e.g., billboards and scoreboards—all by way of example. In this manner, multi-view displays can be incorporated into any environment. Multi-view displays can include multi-view lighting systems, where the multi-view pixels show different lighting patterns at different angles.

In one example scenario, an MV display is used to selectively show captioning to seats in a theater. In this example, each seat has a clear line-of-sight to the MV display, unobstructed by other seats or objects. For each multi-view pixel, a seat is associated with a collection of beamlets that are projected onto that seat, defining a viewing zone. Each beamlet maps to a unique location in the viewing area comprising the seats. Therefore, to show a particular content to a designated a seat, the MV display lights the beamlets associated with that seat with the appropriate colors and brightness.

In other embodiments as will be described in greater detail below with respect to FIGS. 5A-5B, beamlets may not map to unique viewing locations in the viewing area. For example, a first viewing zone may be located directly in front of a second viewing zone relative to the MV display. As a result, a beamlet projected in that direction passes through both the first and the second viewing zones. In such a scenario, the sensing system and the MV display controller will estimate the landing spots of each beamlet to determine the viewing zone in which that beamlet will land, and thus determine the content to be shown by that beamlet. For example, the sensing system and MV display controller may determine whether a person is located in the first viewing zone, in which case the content to be shown by that beamlet will correspond to the content assigned to the first viewing zone. Alternatively, the sensing system and MV display controller may determine that no one is located in the first viewing zone, but a person is located in the second viewing zone, in which case the content to be shown by that beamlet will correspond to the content assigned to the second viewing zone. Example sensing systems for this purpose may include, but are not limited to, depth sensors, time-of-flight sensors, stereoscopic cameras, and/or LIDAR systems.

Generally, the intended viewer is human, but optical devices such as cameras can also be used as a viewer of an MV display, and it is also possible to utilize multi-view displays wherein intended viewers might be non-human viewers such as animals, cameras or other image-capturing entities.

In a multi-view pixel, each beamlet's light can be controlled independently of the light of other beamlets. For example, and without limitation, the light intensity and/or color of an individual beamlet might be controllable independently of the intensity and/or color of the light of other beamlets. Other parameters of beamlet light might also be controlled, such other parameters comprising, for example, spectral composition, polarization, beamlet shape, beamlet profile, overlap with other beamlets, focus, spatial coherence, temporal coherence, etc., to name just a few.

A viewer that looks at a multi-view pixel sees the light of one or more beamlets; in particular, the viewer sees the light of those beamlets that are emitted by the multi-view pixel and fall upon a viewer's pupil. The viewer perceives the multi-view pixel as glowing with the combined light of those beamlets. As with conventional pixels, a multi-view pixel can have a variety of shapes, as perceived by the viewer looking at the multi-view pixel. In this manner, the color and brightness of each pixel, or the presence of detectable light or no-light, may depend on the location of the viewer relative to the MV display. If an MV pixel is projecting the color red to the right, and the color green to the left, individuals simultaneously observing the same pixel may each see a different color depending on whether they are standing to the left or the right of the MV display. Likewise, a pixel may shine light in one direction but not another, so a person standing in one place sees a light, while a person in another place only sees darkness.

Figure 3A:
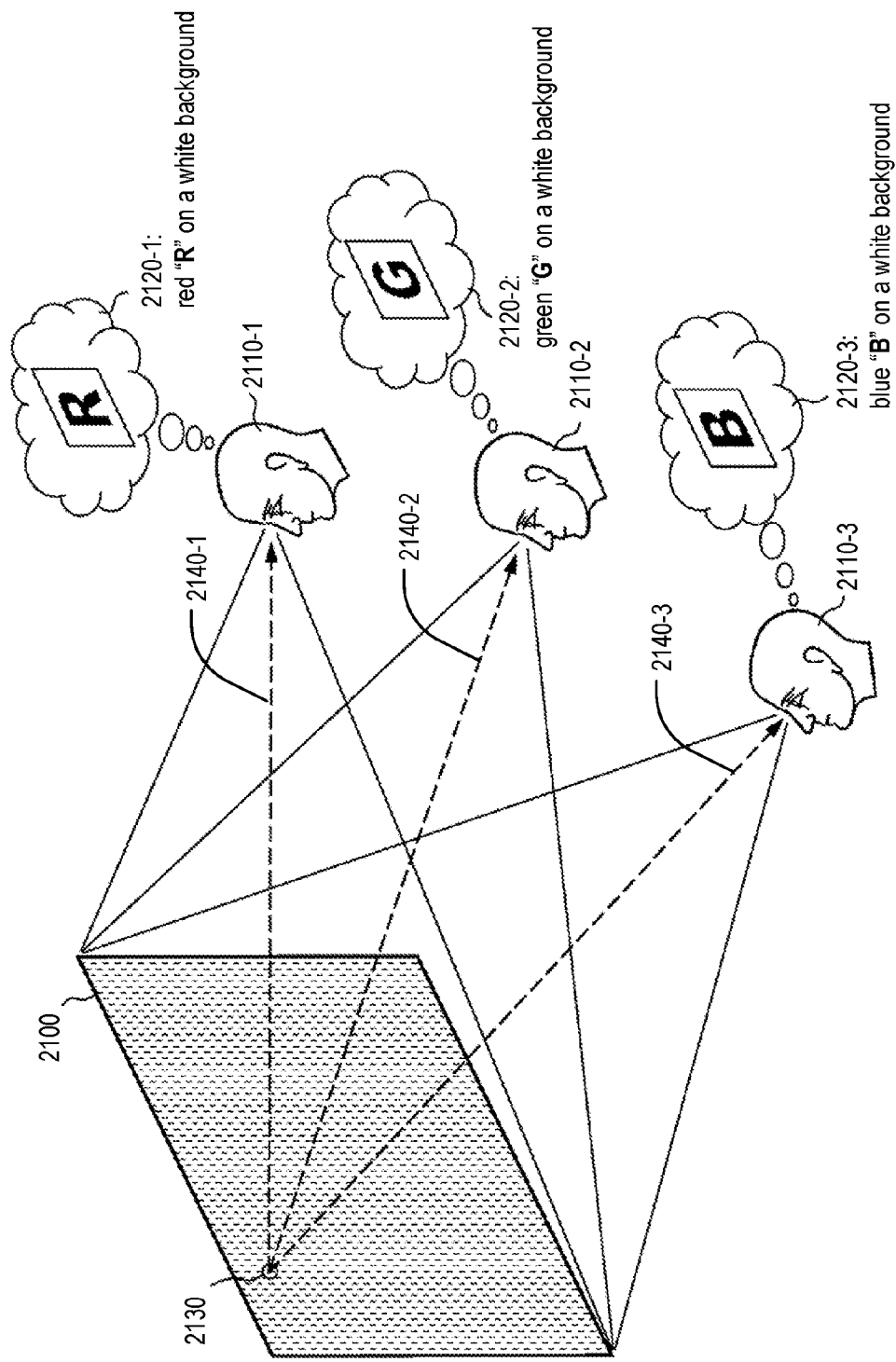
FIG. 3A illustrates the functionality of a multi-view display in accordance with embodiments of the present invention.

FIG. 3A illustrates the functionality of an MV display. In the figure, multi-view display 2100 is viewed simultaneously by three viewers 2110-1, 2110-2, and 2110-3. The three viewers 2110-1, 2110-2, and 2110-3 are positioned at three distinct positions from which the MV display 2100 is visible. Each of the three viewers 2110-1, 2110-2, and 2110-3 sees a different image on the display surface of the MV display 2100. The three different images seen by the three viewers are depicted in FIG. 3A as images 2120-1, 2120-2, and 2120-3. In particular, viewer 2110-1 sees a red letter "R" on a white background, viewer 2110-2 sees a green letter "G" on a white background, and viewer 2110-3 sees a blue letter "B" on a white background.

For each of the three viewers 2110-1, 2110-2, and 2110-3, the experience of viewing the MV display 2100 is similar to viewing a conventional display, such as a standard television set, but each viewer sees a different image on the display surface of the MV display 2100. Each viewer is, possibly, not even aware that other viewers are seeing different images. Hereinafter, the term "viewing space" will be used to refer to the range of possible positions for viewers to experience the MV display functionality.

The functionality of multi-view display 2100 is based on the functionality of the individual multi-view pixels of the MV display. One such multi-view pixel is depicted in FIG. 3A as multi-view pixel 2130. The functionality of the multi-view pixel is best understood by comparison with the functionality of a conventional pixel in a conventional display. A conventional pixel is simply a light source that emits a particular type of light in all directions of emission. For example, in a conventional television set, a pixel is typically implemented with a material that glows when electrically excited. The glow is typically in one of the three primary colors. The glowing material emits colored light uniformly in all directions.

In a scenario like the one depicted in FIG. 3A, if the MV display 2100 were a conventional display, the light emitted by each conventional pixel would reach the eyes of the three viewers with the same color and approximately the same brightness. All three viewers would see the same image on the display surface as a collection of glowing conventional pixels.

In contrast to a conventional pixel, multi-view pixel 2130 is able to emit different light in different directions. In each direction, light of a particular type is emitted as a narrow beam, referred to as a beamlet. FIG. 3A depicts three beamlets 2140-1, 2140-2, and 2140-3, wherein beamlet 2140-1 is aimed at the eyes of viewer 2110-1, beamlet 2140-2 is aimed at the eyes of viewer 2110-2, and beamlet 2140-3 is aimed at the eyes of viewer 2110-3.

In the illustrative example of FIG. 3A, to avoid clutter, the beamlets are depicted as simple dashed lines with an arrowhead indicating the direction of propagation of beamlet light; however, beamlets can have any size and shape. For example, and without limitation, beamlets might have a shape similar to the beam from a searchlight, although, of course, much smaller; but, in general, the optimal size and shape of beamlets depends on the application, environment, and construction of the MV display. Multi-view displays for different uses can have different beamlet sizes and shapes. In some embodiments, different beamlet sizes and shapes might even be found together in the same multi-view display, or even in the same multi-view pixel.

In the scenario of FIG. 3A, each beamlet is wide enough such that both eyes of each viewer can be expected to be within the same beamlet. Therefore, both eyes are expected to see the same light (e.g., the same color and brightness). However, multi-view displays can exist wherein beamlets are small enough that distinct beamlets reach the two distinct eyes of a viewer, such that each of a viewer's eyes sees a different color and/or brightness. This stereoscopic approach may be used to provide the viewer with a perception of 3D depth.

In the illustrative example of FIG. 3A, the three beamlets 2140-1, 2140-2, and 2140-3 each carry light corresponding to the brightness of the image that each viewer is intended to see. For example, as noted above, viewer 2110-2 sees a green letter "G" on a white background, while viewer 2110-3 sees a blue letter "B" on a white background. Correspondingly, there are areas of the display surface where viewer 2110-2 is intended to see the color white while viewer 2110-3 is intended to see the color blue. If multi-view pixel 2130 lies in one such area, beamlet 2140-2 will carry white light, while beamlet 2140-3 will carry blue light. As in conventional displays, viewers perceive images as a collection of pixels of various colors and brightness. With multi-view display 2100, the ability of multi-view pixels to emit different beamlets in different directions makes it possible for different viewers to perceive the same multi-view pixel as having different colors and different brightnesses, such that each viewer sees the collection of multi-view pixels as a different image.

Figure 3B:
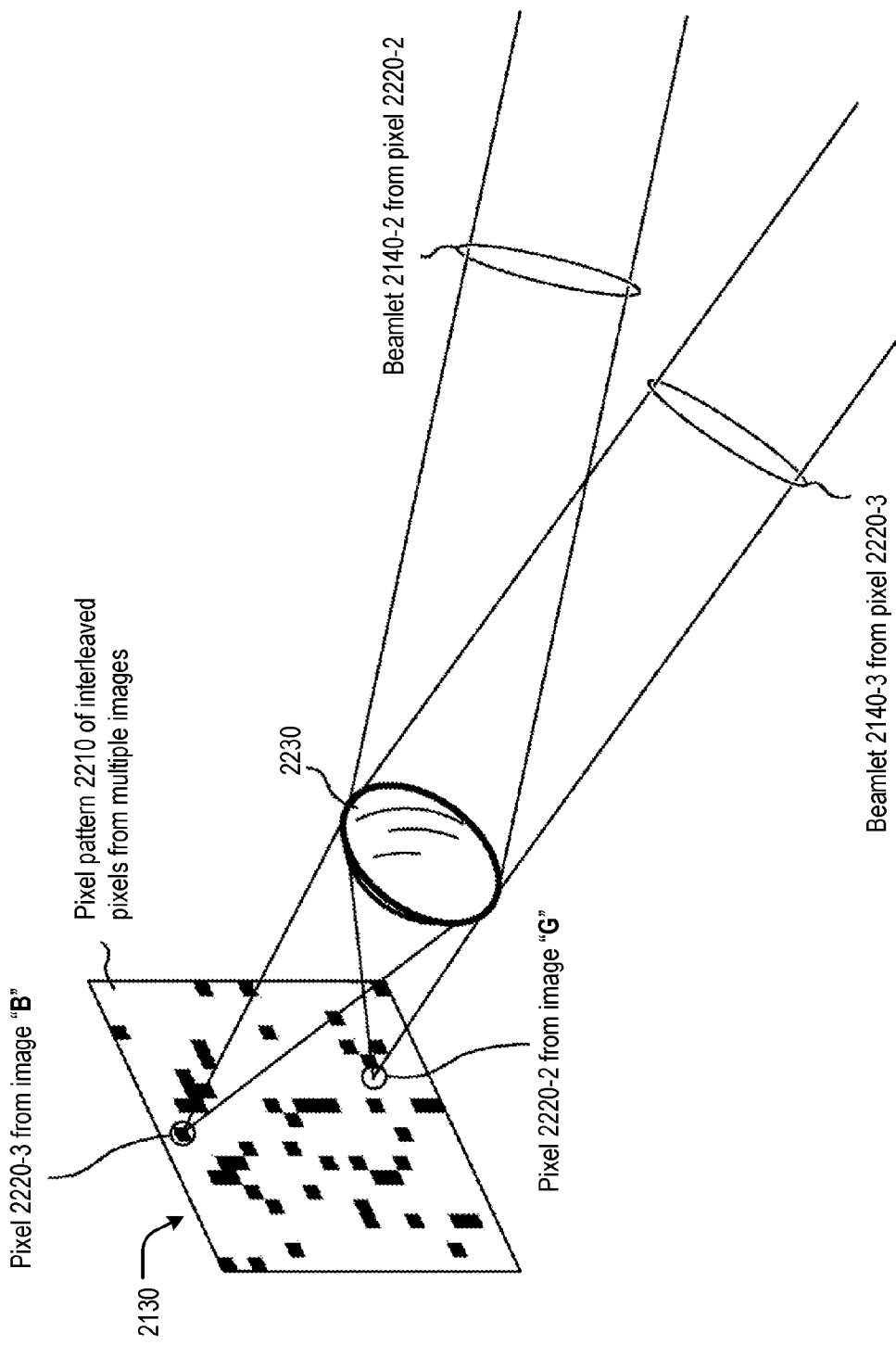
FIG. 3B depicts an illustrative implementation of a multi-view pixel in accordance with embodiments of the present invention.

FIG. 3B depicts a possible illustrative implementation of multi-view pixel 2130. The multi-view pixel comprises a pixel pattern 2210. In FIG. 3B, pixel pattern 2210 is a rectangle with 400 conventional pixels arranged in a 20×20 array. This 20×20 array enables the multi-view pixel to emit as many as 400 different beamlets. Each beamlet originates as a pixel in pixel pattern 2210.

Lens 2230 implements the conversion of a pixel in pixel pattern 2210 into a beamlet. For example, pixel 2220-2 is the pixel that is converted into beamlet 2140-2. As already noted, beamlet 2140-2 is intended to carry white light. Accordingly, pixel 2220-2 may be a conventional pixel that comprises a material able to glow, emitting white light when electrically excited with an appropriate electrical excitation. In the illustrative implementation of FIG. 3B, pixel 2220-2 is electrically excited and emits white light in all directions. Lens 2230 collects a sizable fraction of the emitted white light and collimates it into beamlet 2140-2. Similarly, pixel 2220-3 is the pixel that is converted into beamlet 2140-3, and is intended to carry blue light. Correspondingly, pixel 2220-3 may be a conventional pixel that comprises a material able to glow, emitting blue light. In the illustrative implementation of FIG. 3B, pixel 2220-3 is emitting blue light in all directions. Lens 2230 then collects a sizable fraction of the emitted blue light and collimates it into beamlet 2140-3.

The depiction of the single multi-view pixel 2130 in FIG. 3B is intended to be representative of each the multi-view pixels in multi-view display 2100 as well as of similar multi-view pixels in other multi-view displays. Accordingly, this disclosure will refer to "the pixel pattern 2210" or "the lens 2230" of a multi-view pixel other than multi-view pixel 2130 in order to refer to the equivalent structure of that other multi-view pixel.

The depiction of multi-view pixel 2130 presented in FIG. 3B is similar to the principle of operation of a typical image projector. Indeed, the functionality of the multi-view pixel 2130 may be similar to the functionality of an image projector, with some important differences:

Difference 1: An image projector is typically used for projecting an image onto a screen for viewing. It is desirable for the projected image to be as sharp as possible. Accordingly, a projector's lens is adjusted for best focus. In a multi-view pixel, such an adjustment would result in beamlets that are very small at the focal distance. This is not usually desirable because the optimal size of beamlets depends on the desired multi-view experience provided to viewers. For example, and without limitation, if all viewers in a particular area of a room are intended to see the same image, this can be accomplished via beamlets that are each as large as that area of the room. Also, an ideally-focused projector creates non-overlapping dots on the screen. In contrast, it might be desirable for adjacent beamlets to overlap somewhat, so as to avoid gaps in the viewing space.

Difference 2: An image projector typically has non-overlapping pixels of different colors. Usually, each pixel emits only one of the three primary colors. Correspondingly, the projected image consists of non-overlapping dots wherein each dot is of one of those colors. The visual perception of a full color palette is achieved because, from a distance, the individual dots are not resolved by the human eye, and the three primary colors blend together into a perceived color that depends on the relative strength of the primary colors. In contrast, a single beamlet of a multi-view pixel might carry the full palette of possible colors. For example, beamlet 2140-2 is intended to carry white light because the background of image 2120-2 is white. To allow the background of image 2120-2 to be any color, beamlet 2140-2 should be able to carry light of any color. Therefore, in the illustrative implementation of FIG. 3B, pixel 2220-2 should be able to emit light of any color. This could be accomplished, for example, by positioning a diffuser in front of the image projector so as to diffuse the light emitted by the projector, thereby blending together the light from each of the RGB sub-pixels into a single beamlet.

In alternative implementations, beamlets might be sized large enough to have substantial overlap, such that at each position in the viewing space, three or more beamlets are simultaneously visible from the same multi-view pixel or from nearby multi-view pixels. In such implementations, it might be acceptable to have monochromatic (single-color) beamlets, because the relative strength of overlapping beamlets can be adjusted to yield a desired color perception.

Difference 3: An image projector must emit light bright enough for a visible image to form on the screen. Indeed, a person that walks in front of a projector and looks toward the projector usually finds the brightness to be unpleasantly bright and objectionable. In contrast, a viewer of an MV display may be looking directly at the light emitted by the multi-view pixels. The light should be bright enough to be visible, but not so bright as to be objectionable. As a result, if a multi-view pixel were used as a conventional projector to project an image onto a screen, the image on the screen can be expected to be inadequately faint. The resulting projected image is likely to be virtually difficult to detect in normally-lighted environments.

Figure 3C:
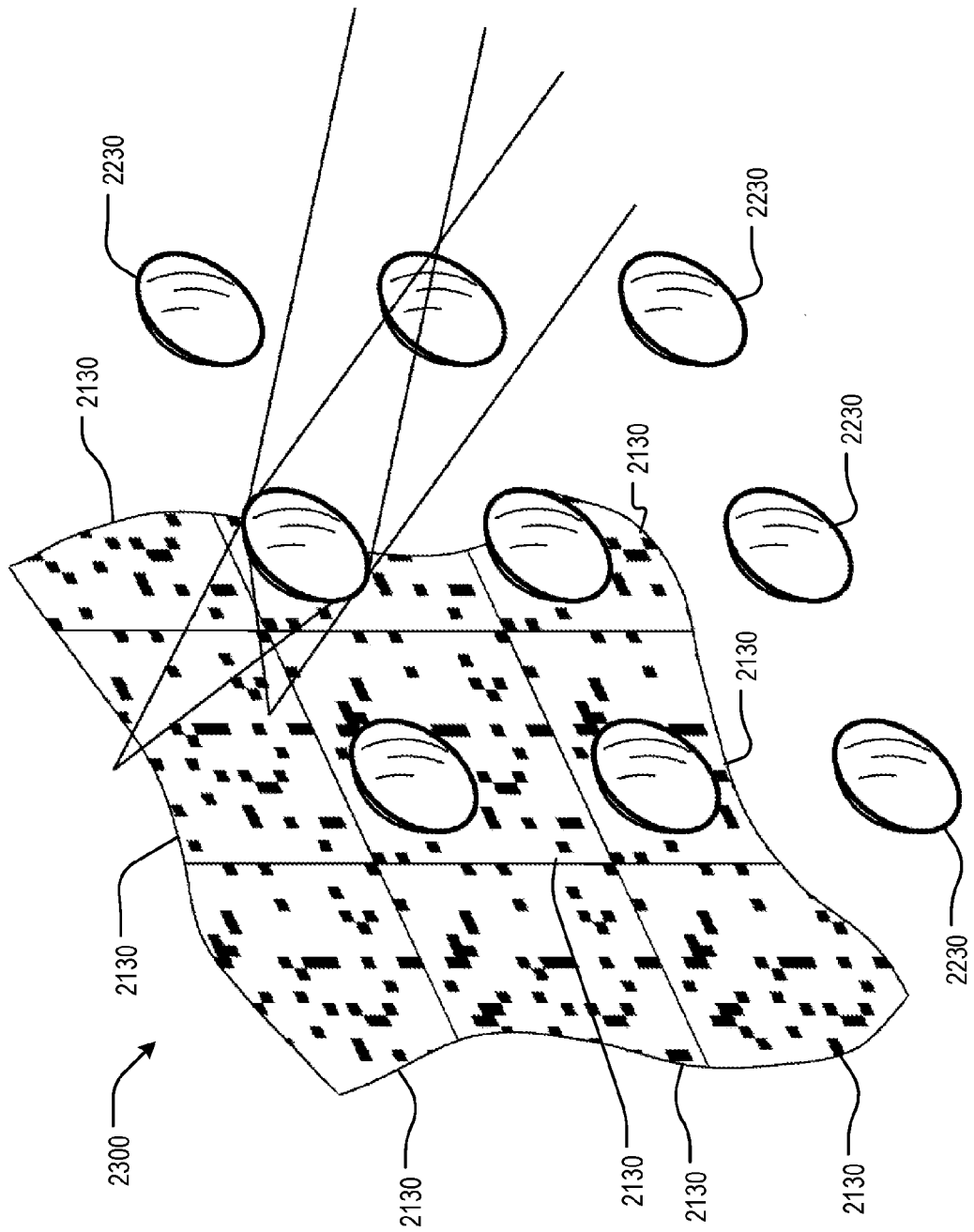
FIG. 3C illustrates an example array of multi-view pixels in accordance with embodiments of the present invention.

FIG. 3C illustrates how multiple multi-view pixels might be assembled together as an array to form an MV display. In a conventional display, a regular (usually rectangular) array of adjacent pixels is typically used to form images. In an MV display in accordance with the illustrative example of FIG. 3C, the multi-view pixels 2130 are also arranged in a rectangular array 2300, a portion of which is shown in FIG. 3C. The pixel patterns 2210 of the multi-view pixels 2130 are juxtaposed in a rectangular array, and corresponding lenses 2230 are positioned in front of the associated pixel pattern 2210, so that the lenses 2230, too, are arranged in a rectangular array.

A viewer of the MV display 2100 such as, for example, viewer 2110-01, looking at the array of lenses, may see one beamlet 2140 from each of the lenses 2230. In other words, each lens 2230 may appear as a disc that emits the light of the beamlet that reaches the viewer 2110-01 from that multi-view pixel. From a distance, the collection of discs is perceived by that viewer 2110-01 as an image, much the same way as the collection of conventional pixels of a conventional display is perceived as an image, when viewed from a distance. Alternatively, the MV display 2100 might be for displaying numbers or characters as patterns of dots wherein each disc is a dot.

In FIG. 3C the lenses 2230 are shown as floating in space; the support structure for the lenses 2230 is not shown. In practice, the lenses 2230 might be supported, for example, and without limitation, by a dark sheet that, in addition to mechanical support, would also provide an opaque background and would block stray light from the pixel patterns 2210. From a distance, the light from the pixel patterns 2210 would then only reach the viewer's eyes via the beamlets that pass through the lenses. The viewer would see the lenses as illuminated discs on the dark background of the dark sheet. A mechanical support for the lenses is not shown in FIG. 3C in order to better illustrate the arrangement of pixel patterns 2210.

In electronic displays, pixels are usually arranged in a rectangular array. To prepare an image for displaying, the image is typically "rasterized", meaning that the image is subdivided into a plurality of small rectangles that match the geometry of the pixel array. The average color and brightness of each small rectangle determines the color and brightness of a corresponding pixel. In modern electronic displays the accuracy with which pixels are positioned in the pixel array is excellent, such that the correspondence between small rectangles and pixels can be derived computationally, based on the nominal geometry of the array, without the need to know in advance any additional parameters specific to the display unit that will be used for showing the image. With most conventional displays, it is also not necessary to know in advance how and where the display will be installed.

With a multi-view pixel such as multi-view pixel 2130, it is reasonable to expect that the pixel pattern 2210 can be made as, for example, and without limitation, a rectangular array of conventional pixels with the same degree of accuracy that is feasible for the abovementioned conventional displays. This could be expected to result in a pattern of beamlets wherein the relative geometry of the beamlets can be accurately derived from the geometry of pixel pattern 2210. This, however, might not be easy to accomplish. Beamlet geometry is altered by any imperfections in lens 2230, and the pattern of beamlets, as they reach locations in the viewing space, depends significantly on the geometry of the viewing space itself and on the position and orientation of the multi-view pixels relative to the viewing space.

Although FIG. 3C depicts distinct multi-view pixels 2130 as being identical to one another and identically oriented, in other embodiments, it might be desirable for an MV display to have multi-view pixels of different types. Also, it may be advantageous for multi-view pixels to be oriented differently in different areas of the display surface. For example, multi-view pixels near the center of the display surface could be oriented such that their beamlets propagate symmetrically outward, relative to the plane of the display surface, while multi-view pixels near the edge of the display surface could be oriented such that beamlets propagate more toward the center of the display. This might be done in order to achieve optimal coverage of the viewing space. Such differential orientation could be accomplished by changing the orientation of individual multi-view pixels placed on a flat surface, or it might be accomplished by making the display surface curved (e.g., by arranging the multi-view pixels such that all of the lenses in the array are not coplanar). In other situations, such as in the case of multi-view displays for irregular surfaces and other similar applications, the orientations of the multi-view pixels might be in very non-standard configurations that can be difficult to characterize a-priori. In all such cases, it might be difficult to know a priori the exact orientation of each multi-view pixel. Embodiments of the present invention can advantageously provide a calibration process for learning the orientation of all beamlets of all the multi-view pixels.

Calibration.

To provide the various forms of desired content to each of their corresponding viewing zones, a calibration procedure may be used to associate beamlets of an MV display with viewing locations, and to determine the colors and brightness needed for each pixel. The calibration may be achieved with the aid of a camera or cameras mounted on, or located near, the MV display, or through some other method. The calibration procedure may compute a relationship between the beamlets and the viewing zones. This relationship can include, but is not limited to, tables, mathematical relationships, and/or functions.

The viewing area of an MV display can be measured by a coordinate system. In one example, the coordinate system can be based on the physical dimensions of the viewing environment. In another example, the viewing environment can be within sight of a 2D camera of sensing system 154, and the coordinate system can be set by the 2D pixel coordinates in the camera. In this case, the 3D space of the viewing environment may be calibrated using a 2D coordinate system based on a 2D representation of the viewing environment. In yet another example, the viewing environment can be within sight of a depth sensor, such as a stereoscopic camera, and the coordinate system can be the 3D coordinate system of the depth sensor.

Calibrating to a Sensing System.

As described above, in some embodiments, an MV display can be calibrated to a sensing system that is sensing one or more characteristics of the viewing environment. The coordinate system of the viewing environment could be set as the coordinate system of the sensing system. Example sensing systems include, but are not limited to, cameras and/or depth sensors.

As an example, the beamlets of a multi-view pixel can be arranged in a rectangular grid and indexed by the X and Y coordinates of the beamlet. This would be the case if a multi-view pixel were implemented using a traditional projector. The viewing environment is within sight of a 2D camera. The calibration procedure can compute a mathematical relationship between the beamlet coordinates in the multi-view pixel and the camera pixel coordinates of the associated viewing zone as captured by the 2D camera. With this relationship, the viewing zone of any beamlet in the multi-view pixel can be computed.

When using a 2D camera to establish a coordinate system of the viewing environment of an MV display, an issue arises where the viewing environment is a 3D space. The pixel coordinates of a 2D camera, in this case, would map not to a unique viewing zone in the viewing environment but a ray of viewing zones with the same angle relative to the camera. To address this, the mathematical relationship between the beamlets of the multi-view pixel and the 2D coordinate system of the 2D camera may be defined for a set of viewing zones with unique angles relative to the 2D camera. An example of such a set of viewing zones can include, but is not limited to, a set of planes.

In accordance with embodiments of the present invention, an example calibration process may be performed using an MV display, a sensing system (e.g., a first 2D camera), and a repositionable calibration device. The calibration device may comprise a second 2D camera, a processor, and a light source (e.g., an LED) positioned approximately at the location of the second camera. The following example procedure can be performed. The calibration device is positioned in a first location within the viewing environment corresponding to a first viewing zone. In step 1, the LED of the calibration device is flashed. In step 2, images of the viewing environment are captured using the first 2D camera of the sensing system. In step 3, the location of the calibration device LED in the 2D camera coordinate system is determined using image processing techniques. In step 4, patterns are flashed on the MV display to uniquely encode every beamlet of every multi-view pixel. In step 5, images of the MV display are captured using the second 2D camera of the calibration device. In step 6, the beamlet from each multi-view pixel that is captured by the 2D camera of the calibration device while in the first location is determined using image processing and decoding techniques. In step 7, the beamlet and viewing zone association. In step 8, the calibration device is repositioned into the other viewing zones in the viewing environment, and steps 1-7 are performed for each of those viewing zones. In step 9, an approximate mathematical relationship between the beamlets and viewing zones given the recorded beamlet and viewing zone associations is computed.

A similar procedure can be performed using a depth sensor instead of the first 2D camera of the sensing system. In this case, the relationship between beamlets and viewing zones can be computed for all viewing zones within the 3D viewing environment, and may not be limited to viewing zones with unique viewing angles.

The complexity of the computed mathematical relationship can be dependent on the characteristics of the multi-view pixel and camera or depth sensor. For example, if a traditional, undistorted projector is used as a multi-view pixel and the camera is also undistorted, a simple linear model can be used. However, lens distortion and other effects can cause the mapping between the beamlet and viewing zones in the camera coordinate system to fit poorly with a linear model. In such cases, more complex or higher order mathematical models may need to be used to produce a more accurate relationship.

Figure 3D:
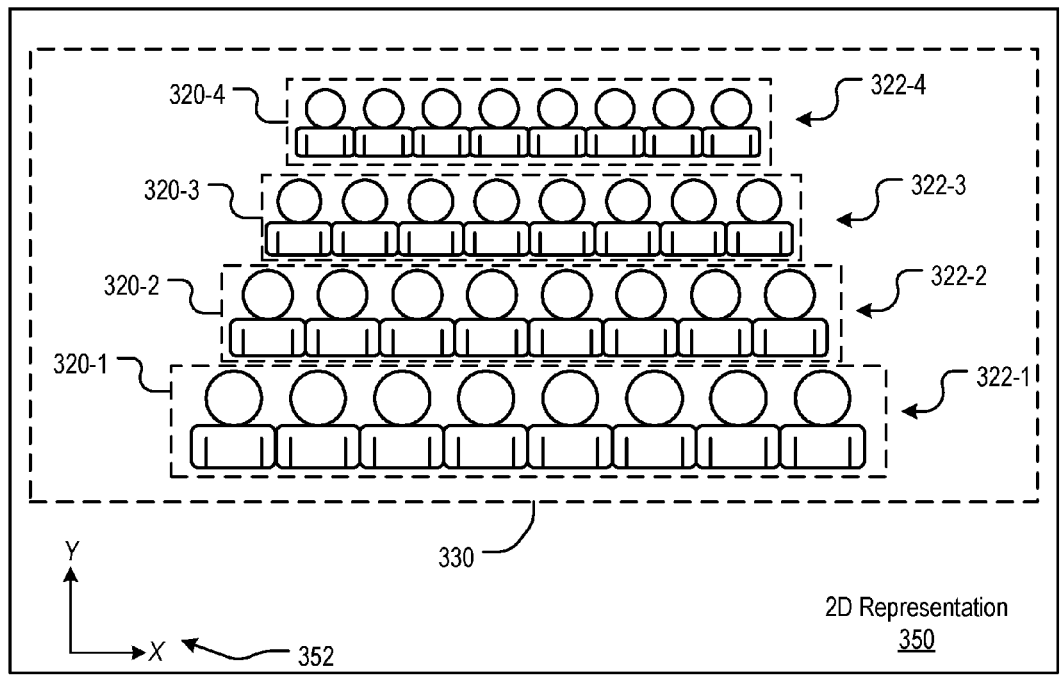
FIG. 3D illustrates a two-dimensional representation of a three-dimensional viewing environment in accordance with embodiments of the present invention.

In a simpler implementation illustrated in FIG. 3D, a 2D camera captures a 2D image of the 3D viewing environment, and the coordinate system can be set by the 2D pixel coordinates in the camera. For example, when the viewing environment is a theater having stadium seating such that a 2D image captured by the 2D camera can be used to produce a 2D representation 350 of the viewing environment using an X-Y coordinate system 352. In this case, a different viewing zone 320-1 to 320-4 may be created for each row of seats in the theater, and these viewing zones 320-1 to 320-4 can be defined by the X and Y coordinates of the X-Y coordinate system 352.

Calibrating to a Pre-Existing Model of the Viewing Environment.

In some situations, a pre-existing model of the viewing environment may be available. Examples of such models include, but are not limited to, models of the interiors of a building, models of an outdoor venue, and/or models of cities. In such cases, the coordinate system of the viewing environment may be set as the dimensions of the model or the real-world dimensions, and the sensing system need not be used to determine the dimensions of the viewing environment.

An MV display installed at a venue can be calibrated to a pre-existing model of the venue with a calibration device comprising a camera and processor. To calibrate to an existing model of the viewing environment to an MV system, the following example procedure can be performed. In step 1, the location of a desired calibration point viewing location in the model of the viewing environment is identified. In step 2, the calibration device is positioned at the calibration point viewing location and oriented such that the MV display is within view of the calibration device camera. In step 3, patterns are flashed on the MV display to uniquely encode every beamlet of every multi-view pixel. In step 4, images of the MV display are captured using the calibration device camera. In step 5, the beamlet from each multi-view pixel that lands on the calibration device camera is identified using image processing and decoding techniques. In step 6, the beamlet and viewing location associations are recorded. In step 7, the calibration device is repositioned in other viewing locations in the viewing environment, and steps 1-6 are performed for each of those viewing locations. In step 8, an approximate mathematical relationship between the beamlets and viewing locations is computed based on the recorded beamlet and viewing location associations.

Other well-known image processing techniques can also be used to calibrate the MV display to a pre-existing model. For example, a spatial sensing system, such as a stereoscopic camera, can be used. A registration between the stereoscopic camera and the pre-existing model may be performed. Known techniques for automatic 3D point cloud registration in image processing may be used to perform this registration. For example, a light source may be positioned in multiple known locations in the 3D model, with each location being detected by the stereoscopic camera. These multiple data points can be used to mathematically compute the registration parameters.

Pre-Calibration.

The use of more complex mathematical models of the viewing environment may increase the number of calibration points needed to accurately and precisely compute the model. In general, the more complex the model, the more accurate the mapping can be, but also the more calibration points are needed. If all of the calibration points are captured upon each installation of the MV display and sensor, the installation process may become cumbersome.

For example, to accurately compute the distortion of a multi-view pixel, it may be desirable to choose calibration points that sample the entire viewing environment of the multi-view pixel. In certain cases, this may be a non-trivial task. For example, a multi-view lighting unit provided on a large building or other structure may be viewed across an entire city. As a result, a manual calibration of each viewing zone would require an operator to travel all around the city to capture sufficient calibration points. To reduce the number of calibration points required, the system may incorporate a model of how beamlets are geometrically arranged with respect to each other so that after finding the correspondences of a small number of beamlets, the rest can be calculated via the geometric model.

An example calibration procedure can be broken down into a two-phase process.

Phase 1: Pre-calibration. The purpose of the pre-calibration phase is to determine the geometric relationships among the beamlets of a single multi-view pixel to each other. This could be performed in a factory using the disclosed methods by calibrating to a known geometry such as a plane at a known location relative to the MV display. It may also be inferred from the opto-mechanical design of the multi-view pixels. For example, a certain lens configuration may produce a known radial distortion. It would be assumed that this pre-calibration remains valid even after installation in a venue. An example pre-calibration step can compute a mathematical model that undistorts the multi-view pixel's beamlet pattern. A similar pre-calibration step is often done in camera systems, where the intrinsic distortion characteristics of a camera lens system are precomputed and applied to undistort captured images.

Phase 2: Registration. In the registration phase, the geometric relations of a small number of beamlets to the viewing environment after installation is determined. Using the results of pre-calibration, the geometry of the remaining beamlets with respect to the viewing environment can then be estimated through interpolation and other mathematical techniques. Because pre-calibration has already been performed, fewer calibration points may be needed to compute the mathematical model between beamlets and viewing zones.

User Interface for Designing Multi-View Display Content

In accordance with embodiments of the present invention, systems and methods are provided for assigning content for display by an MV display in a 3D space. As described above, a zone management device 170 may be used to manage the various viewing zones in a viewing environment and content to be displayed to those viewing zones. The zone management device 170 includes a user interface for providing a zone management tool for configuring one or more unique viewing zones in the viewing environment and a content assignment tool for assigning visual content for display in each of the viewing zones.

Figure 4A:
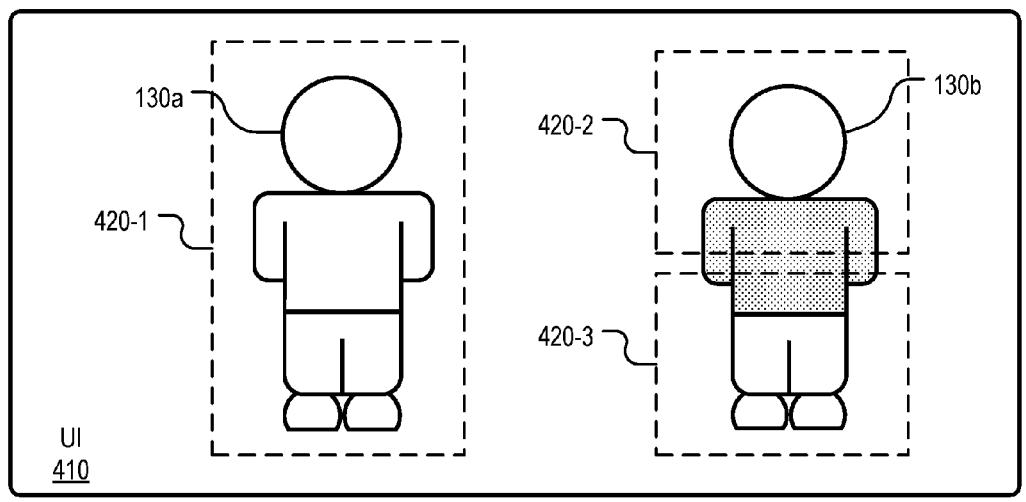
FIGS. 4A-4B are simplified illustrations of a user interface provided by a zone management device, in accordance with embodiments of the present invention.

FIG. 4A is a simplified illustration of a user interface 410 provided by a zone management device 170, in accordance with embodiments of the present invention. In some embodiments, the zone management device 170 and the system controller 152 may be implemented on the same computing device. In other embodiments, the zone management device 170 may be in wired or wireless communication with the system controller 152 to interactively operate the MV display 150. The zone management device 170 can be used to transmit viewing zone and assigned content information to the system controller 152 to update the MV display 150. As will be described in greater detail below, viewing zone information can include, but is not limited to, viewing zone positions, sizes, shapes, and/or boundaries, as well as viewing zone metadata including, but not limited to, a number of viewing zones and/or an arrangement of viewing zones.

Zone management tool software 280 running on the zone management device 170 may be used to manage the viewing zones and content assignment. Viewing environment data 282, including information relating to the viewing zones and assigned content, may be stored in the storage 278 of the zone management device 170 for later retrieval. In other embodiments, viewing environment data 282 may be transmitted by the zone management device 170 for storage on another computing device in real-time or near-real-time. The zone management tool software 280 may also communicate with programs running on the system controller 152 to interactively control the MV display 150.

The zone management device 170 may receive inputs from a user to perform any of a variety of actions. The processor 274 receives inputs from the input device 272 (which could be, e.g., a touchscreen display), processes the input (e.g., to update the viewing zone, viewing area, and/or assigned content information), and renders the updated representations on the user interface 410. Example user actions to manipulate viewing zones include, but are not limited to, adding a viewing zone, removing a viewing zone, resizing a viewing zone, moving a viewing zone, copying a viewing zone, pasting a viewing zone, rotating a viewing zone, reshaping a viewing zone, replicating a viewing zone in a predetermined pattern, selecting a viewing zone, adding conditions to a viewing zone (e.g., criteria that might add, eliminate, or otherwise affect one or more of the viewing zones in the event that the condition is met), and/or assigning content to a viewing zone.

The user interface 410 on the zone management device 170 may be used to display a representation of the viewing environment as well as representations of the viewing zones that have been created in the context of the total viewing environment. For example, the viewing environment may be represented with an actual image of the viewing environment captured by the imaging device 220. In other embodiments, the viewing environment may be represented with a simplified graphical illustration of the viewing environment, based on a model of the viewing environment. The viewing zones can be represented as shapes superimposed on the viewing environment.

The viewing zone representation can be sized, shaped, and positioned in the viewing environment representation to enable the user to assign visual content to be displayed to users located in each of those viewing zones. As a result, a viewer positioned within the boundaries of a particular viewing zone would see the content assigned to that viewing zone. In the simplified embodiment illustrated in FIG. 4A, three viewing zones, 420-1, 420-2, and 420-3, are established and depicted as rectangular boxes in the user interface 410. A first viewer 130a positioned in the first viewing zone 420-1 would view on the MV display the visual content assigned to the first viewing zone 420-1. A second viewer 130b whose eyes are positioned in the second viewing zone 420-2 would view on the MV display the visual content assigned to the second viewing zone 420-2. Although there are no viewers positioned in the third viewing zone 420-3 at this time, if the eyes of the second viewer 130b moved into the third viewing zone 420-3 (e.g., if the second viewer 130b were to crouch or sit down), then the second viewer 130b would view the visual content assigned to the third viewing zone 420-3 and would no longer view the content assigned to the second viewing zone 420-2.

Figure 4B:
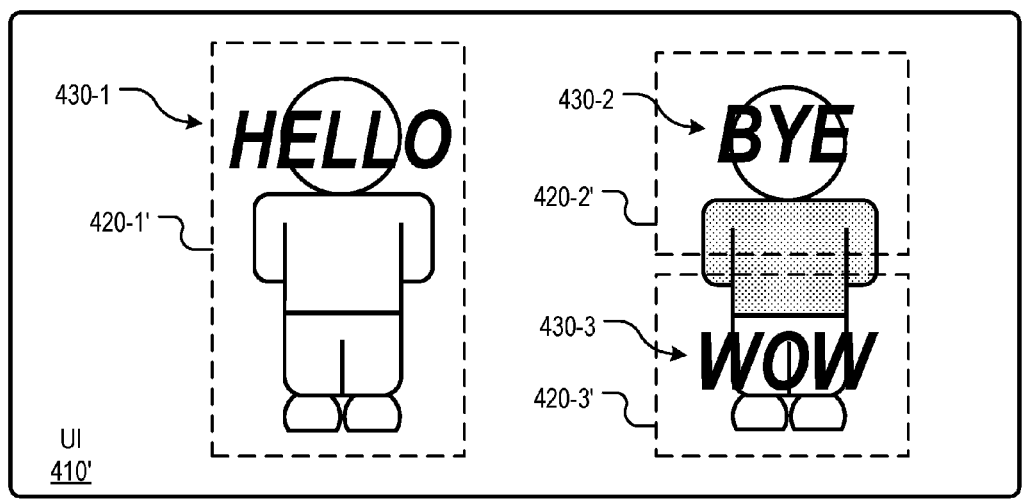

FIG. 4B illustrates another embodiment in which the user interface 410' superimposes representations of the assigned content along with the representations of the viewing environment and viewing zones. In this embodiment, the MV display 150 is used to display differentiated character-based messages to different viewing zones and the characters to be shown to each viewing zone is superimposed on the representation of the viewing zone in the user interface 410', so the user of the zone management device 170 can easily see what characters/text are assigned to each viewing zone. In the illustrated embodiment, a first message 430-1 of "HELLO" is displayed within the boundaries of the rectangle representing the first viewing zone 420-1' to indicate that viewers positioned in the first viewing zone 420-1' would see the word "HELLO" on the MV display 150. Similarly, a second message 430-2 of "BYE" and a third message 430-3 of "WOW" are displayed over the second viewing zone 420-2' and third viewing zone 420-3', respectively, to indicate to the user what a viewer in those viewing zones 420-2' and 420-3' would see on the MV display 150. The character-based content may comprise one or more of, for example, text, numbers, symbols, emoji's, and emoticons.

The representations of the viewing zones described herein and depicted in the figures are merely examples and that other mechanisms may be used for representing the viewing zones, including, but not limited to, freeform shapes, polygons, circles, ovals, and/or other shapes. Some representations can reduce the amount of data needed to represent the viewing zone. For example, a rectangle requires 4 vertices of data, while a pentagon requires 5 vertices of data. Some representations may be desired over others for compatibility with the multi-view display computational pipeline. For example, triangle rendering engines are common in graphics systems, allowing 2D polygons to be rendered more easily than freeform shapes.

In accordance with embodiments of the present invention, the zone management device 170 may be used to create and/or modify the various viewing zones in a viewing environment. A user may use the zone management device 170 to move an existing viewing zone using any of a variety of methods including, but not limited to, touching and dragging, clicking and dragging, and/or using keyboard arrows to move the viewing zone a desired amount in the desired direction. A user may use the zone management device 170 to resize a viewing zone using any of a variety of methods including, but not limited to, touching and dragging the corners of the viewing zone, clicking and dragging the corners of the viewing zone, and/or using multi-touch gestures to resize the viewing zone, including, but not limited to, pinch-to-zoom. Viewing zones may be created using similar techniques, such as, e.g., pressing button, selecting viewing zone creation action from a toolbar or a drop-down menu, keyboard hotkeys, etc.

Figure 5A:
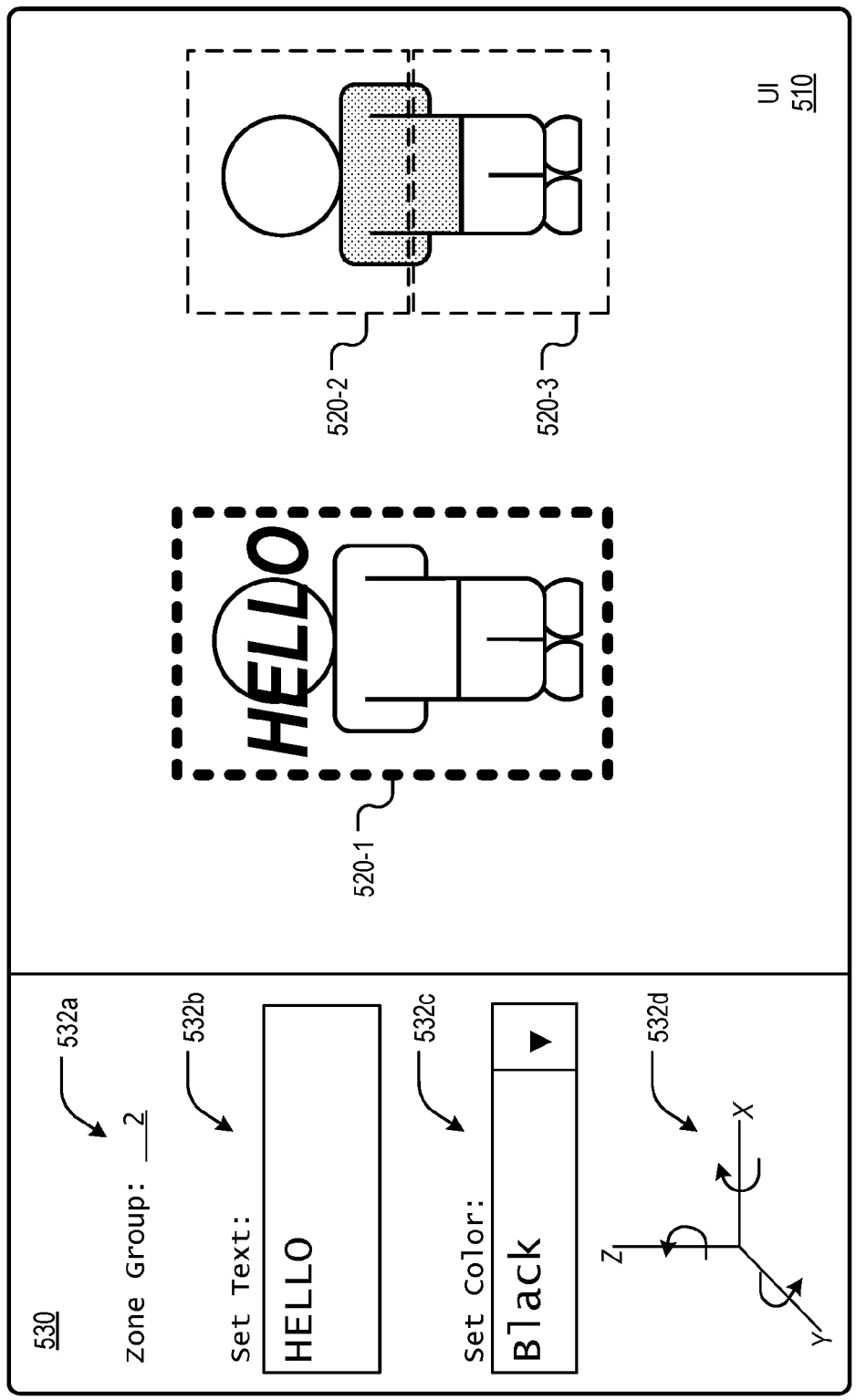
FIGS. 5A-5B are simplified illustrations of a user interface of a zone management device, in accordance with embodiments of the present invention.

FIG. 5A illustrates another embodiment in which the user interface 510 includes a management menu 530. The management menu 530 may include one or more user interface elements (e.g., UI elements 532a-532d) for managing the viewing zones and/or assigning content for display in those viewing zones. A user may utilize the UI elements 532a-532d in the management menu 530 to perform any of a variety of actions, such as, e.g., to add a viewing zone, delete a selected viewing zone, set the text for the selected viewing zone, and set the color of the text for the selected viewing zone. It is to be understood that the UI elements 532a-532d depicted in FIG. 5A are merely simplified examples and that the UI elements can be provided in any suitable way, as would be understood by one of ordinary skill in the art, to perform fewer, greater, and/or different actions than those depicted in FIG. 5A.

When a user wishes to assign visual content to a particular viewing zone, the user can utilize the UI 510 to select that viewing zone using any of a variety of methods, including, but not limited to, touching the viewing zone displayed on the touch-sensitive display, utilizing a mouse or touchpad to click on the viewing zone with a pointer or mouse cursor, utilizing keyboard arrow keys to iterate through viewing zones, and/or inputting a viewing zone identifier using a keyboard. Viewing zones might also be listed on a menu, allowing the user to scroll through and select the desired viewing zone, or to search for and identify the desired viewing zone by one or more characteristics (including, but not limited to, size, distance from the MV display 150, content, targeted audience) or by a label or color associating the viewing zone with its graphical representation. Once a viewing zone is selected by the user, the selected viewing zone can be indicated by a variety of methods including, but not limited to, highlighting, different outline types (e.g., dashed vs. solid lines for depicting the outline of the viewing zone), specialized corner markers, and/or other visual identifier. In the embodiment shown in FIG. 5A, the selection of the first viewing zone 520-1 is indicated with a thicker line weight for the outline of the selected viewing zone 520-1 than the line weight for the other viewing zones 520-2, 520-3.

Content can be assigned to viewing zones by inputting a representation of the content via the user interface. An example is text-based content, where a user can type the desired text into text field in the user interface. An alternative method is to select an existing content file to assign to a viewing zone. In other embodiments, a viewing zone can be assigned to a content identifier, where the content to be displayed is not pre-defined. The system controller 152 can determine the content to be displayed for each content identifier and can generate the content to be displayed or retrieve the content from an external source, such as, e.g., the content server 210. In an example scenario, each viewing zone can be assigned a unique television news channel such that users in each of those viewing zones would see only the news channel assigned to the viewing zone in which those users are located. The user interface of the zone management device 170 may provide UI elements to allow a user to select the news channel for each viewing zone. During operation, the system controller 152 would retrieve a live streaming video from each assigned news channel and display those news channels on the MV display 150 to the corresponding viewing zones. The UI of the zone management device 170 can display a representation of the channel, such as the channel logo, superimposed over the assigned viewing zone.

As shown in FIG. 5A, the management menu 530 in the UI 510 depicts four example UI elements 532a-532d for assigning content to viewing zones. The first UI element 532a may be used to select a zone group to which the selected viewing zone 520-1 is assigned. Zone groupings may be used to more easily assign the same content or other characteristics to a plurality of viewing zones assigned to that zone group, as will be described in greater detail below. The second UI element 532b includes a text entry field into which the user may enter the textual content to be displayed to users in the selected viewing zone 520-1. In FIG. 5A, the user has entered "HELLO" into the text entry field UI element 532b using, e.g., a virtual onscreen keyboard or a physical keyboard. The third UI element 532c includes a color selection pull-down menu, which a user may use to select a color of the textual content to be displayed to users in the first viewing zone 520-1. The entered text may be displayed on top of the viewing zone 520-1 in the selected color. The fourth UI element 532d includes a rotation tool, which a user may use to rotate the viewing perspective of the viewing environment depicted in the UI 510. It is to be understood that these are merely examples of the types of UI elements that may be used for receiving user inputs. In other embodiments, different types of UI elements may be displayed for receiving user inputs to input desired actions or parameters. Examples of suitable user interface elements include, but are not limited to, buttons, menus, lists, tables, sliders, widgets, dials, touch gestures, in-air gestures, voice commands, anticipation algorithms, and/or eye-tracking.

The zone management device 170 may be used to display the content assigned to each viewing zone in a variety of ways. As shown in FIGS. 4B and 5A, textual content may be displayed within the borders of the viewing zone representation. The color of the text superimposed over a viewing zone in the UI 410' or 510 can match that of the text that will be displayed on the MV display 150 to viewers positioned in that viewing zone. If the text to be displayed on the MV display 150 is too long to fit within the viewing zone boundaries as displayed in the UI, a portion of the text may be shown or the text displayed in the UI can scroll such that, over time, the entire text is eventually displayed on the UI within the viewing zone boundaries.

In accordance with embodiments of the present invention, user may manipulate the depiction of the viewing environment and/or the viewing zones in the UI of the zone management device 170. Example user actions to manipulate the visualization include, but are not limited to, panning, zooming, tilting, changing brightness, and/or changing visualization modes.

Figure 5B:
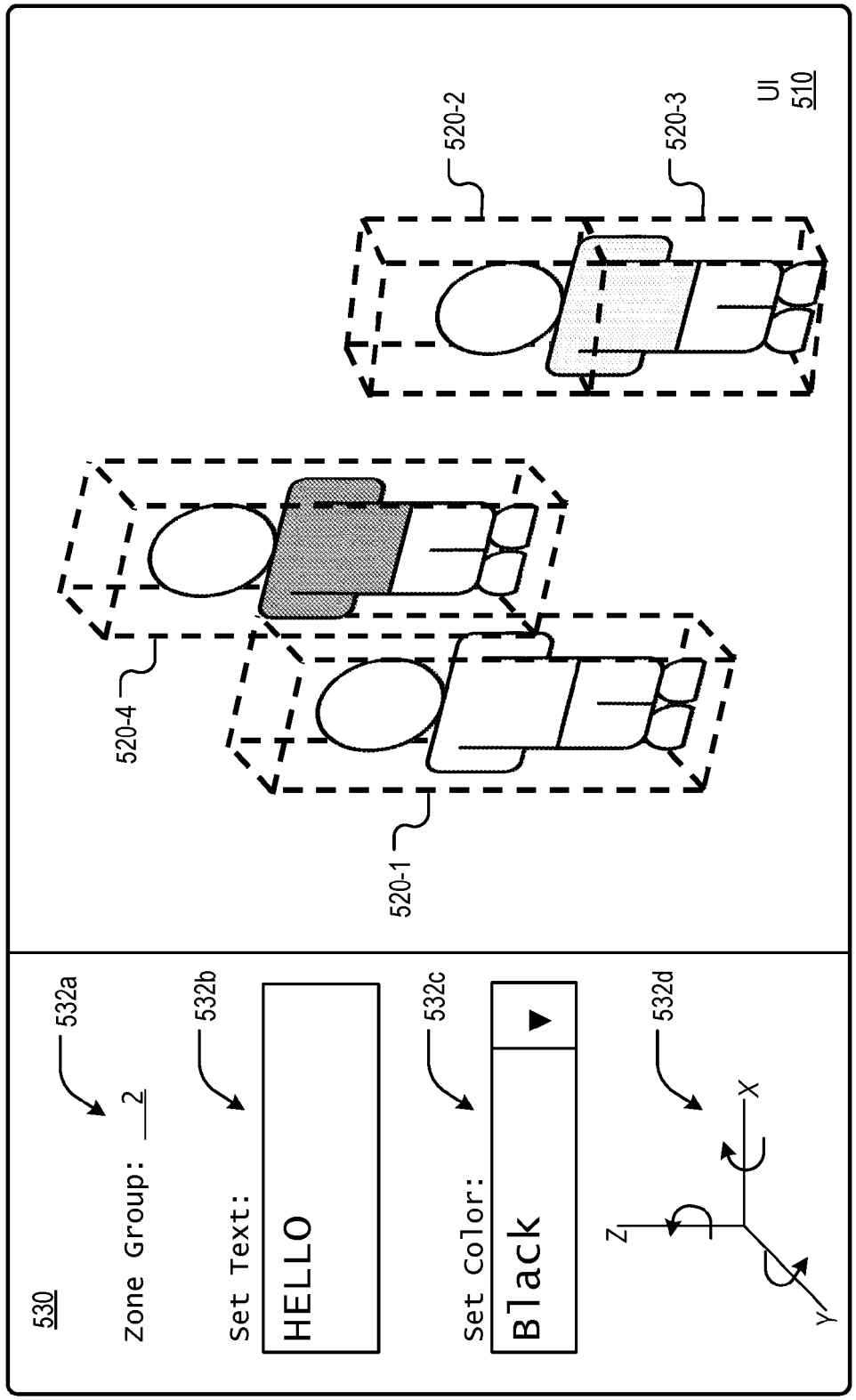

FIG. 5B illustrates an example of a manipulation of the depiction of the viewing environment and viewing zones in the UI 510. In FIG. 5A, the UI 510 depicts the viewing environment from the viewing perspective of the MV display 150 (e.g., the perspective captured by a camera of a sensing system 154 positioned adjacent to the MV display 150. In FIG. 5B, the user has utilized the zone management device 170 to change the viewing perspective of the viewing environment such that the point of view depicted in the representation of the viewing environment has been rotated about the x-axis and z-axis. As a result, the UI 510 in FIG. 5B provides a view of the viewing environment and viewing zones from the perspective of a virtual camera positioned according to the user's manipulation of the viewing environment. In this view, a fourth viewing zone 520-4 is now visible in the UI 510. The fourth viewing zone 520-4 is not shown in FIG. 5A because the fourth viewing zone 520-4 is directly behind the first viewing zone 520-1 and is therefore blocked from view by the first viewing zone 520-1 in the viewing perspective of FIG. 5A. After the user has manipulated the depiction of the viewing environment in FIG. 5B to expose the fourth viewing zone 520-4, the user may then select the fourth viewing zone 520-4 and assign content to be displayed to viewers positioned in the fourth viewing zone 520-4. The representations of the viewing zones can be rendered in a variety of modes including, but not limited to, orthographic projection mode and/or perspective projection mode.

Figure 6A:
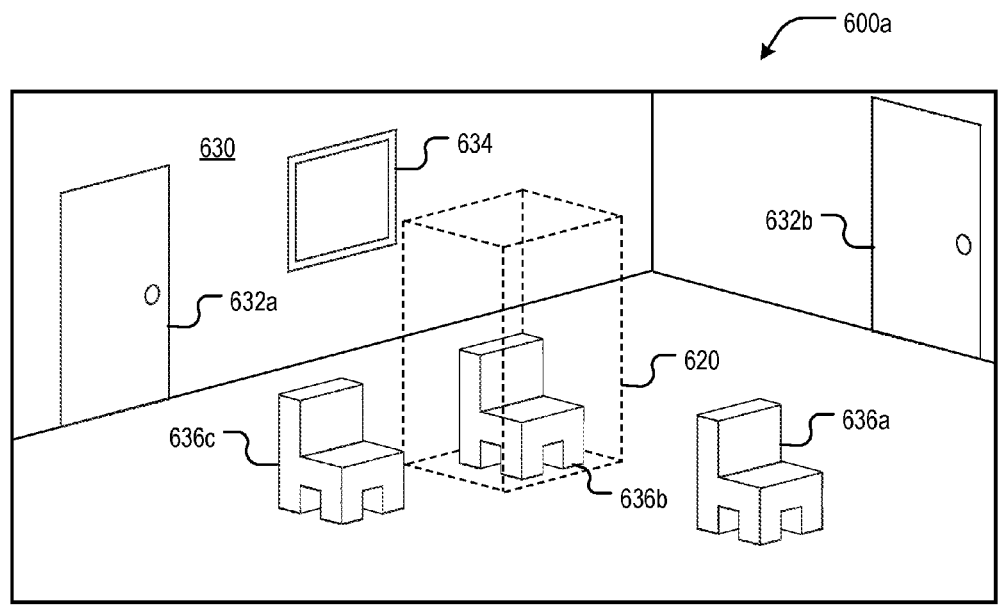
FIGS. 6A-6B illustrate a manipulation of the depiction of the viewing environment and viewing zones in the user interface of a zone management device, in accordance with embodiments of the present invention.
Figure 6B:
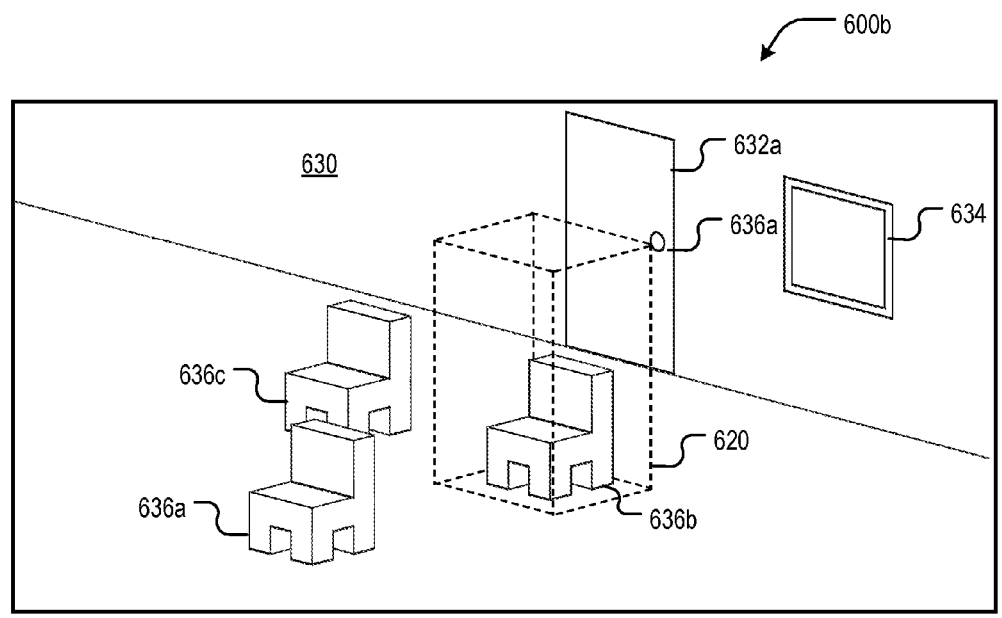

FIGS. 6A-6B illustrate another example of a manipulation of the depiction of the viewing environment and viewing zones in the UI of a zone management device. The depiction 600a of the viewing environment in FIG. 6A shows a first perspective of the viewing environment and a first viewing zone 620, and the depiction 600b of the viewing environment in FIG. 6B shows a second perspective of the same viewing environment. These depictions 600a-600b may be based on a model of the viewing environment generated from actual images taken of the viewing environment. As a result, the depictions 600a-600b may contain more detail about the architectural structures (e.g., walls 630, doors 632a-632b, windows 634, etc.) and structures contained in the viewing environment (e.g., chairs 636a-636c). This additional detail may improve the ease with which a user can identify the locations of desired viewing zones and create those viewing zones with the desired shape and size. For example, based on the depictions in FIGS. 6A-6B, the user can create a viewing zone 620 that fully encompasses the chair 636b such that a viewer seated at that chair 636b will see the content assigned to that viewing zone 620.

In addition to enabling the rotation of the viewing perspective, the zone management device 170 may include a perspective management tool to enable users to manipulate the virtual camera observing the viewing environment by techniques including, but not limited to, panning, zooming, and/or rotating. The virtual camera manipulation (e.g., the panning, zooming, and rotating functions) can be performed using a variety of techniques including, but not limited to, additional UI control elements (not shown in FIG. 5B), touching and dragging, clicking and dragging, pinch and swipe inputs on a touchscreen display, and/or using keyboard arrows.

Figure 7A:
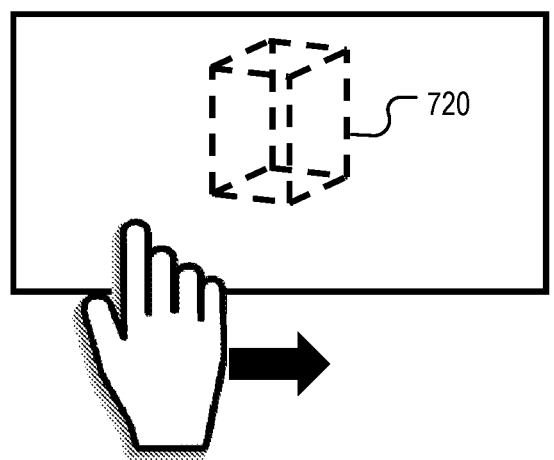
FIGS. 7A-7C illustrate the changing of the viewing perspective displayed in the user interface of the zone management device, in accordance with embodiments of the present invention.
Figure 7B:
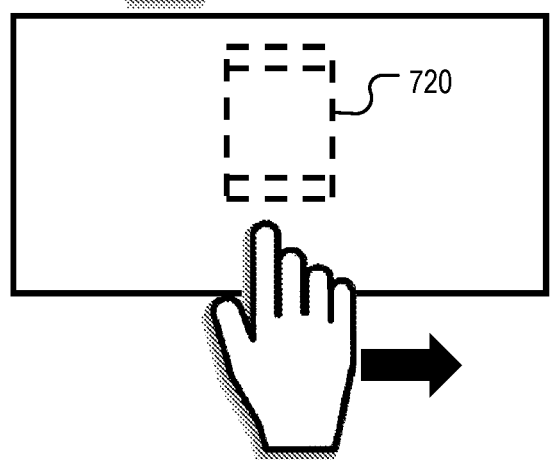
Figure 7C:
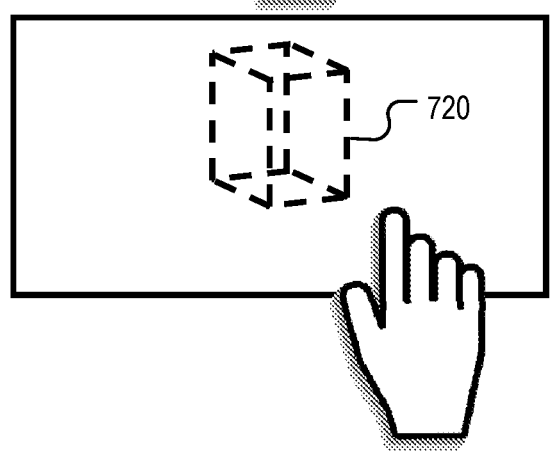
Figure 7D:
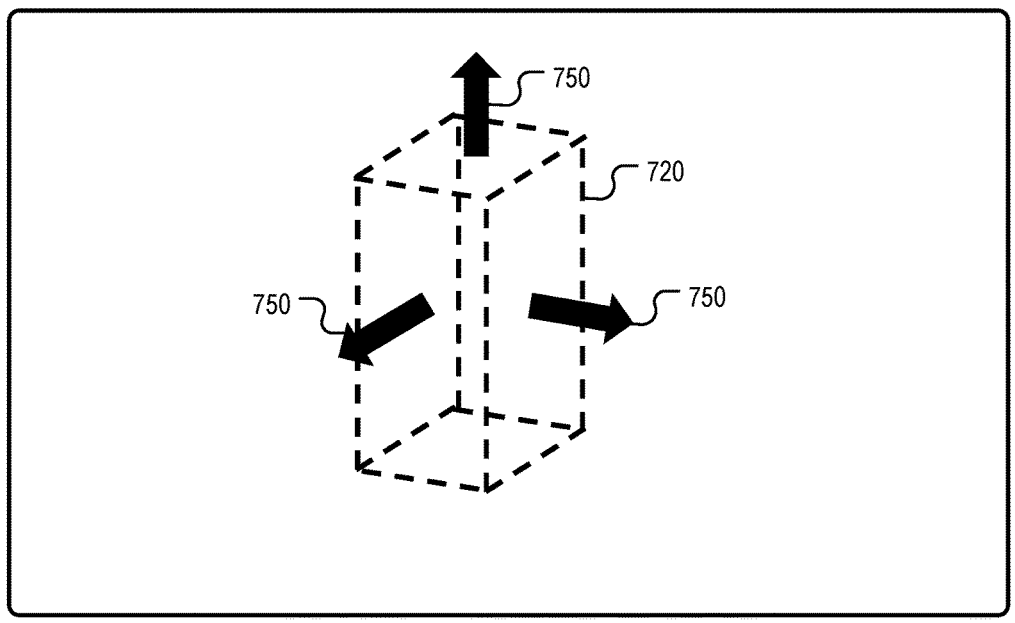
FIG. 7D illustrates the manipulation of a viewing zone, in accordance with embodiments of the present invention.

FIGS. 7A-7C illustrate an embodiment in which a touch and drag gesture to the right can cause the virtual camera to rotate about the vertical axis, thereby changing the perspective of the view of the viewing environment displayed in the UI of the zone management device 170. In FIG. 7A, the user first touches the touchscreen display of the zone management device 170. Then in FIGS. 7B-7C, as the user drags his or her finger across the display to the right, the representation of the viewing zone 720 rotates about the vertical z-axis, thereby enabling the user to more effectively see the size, shape, and positioning of the viewing zone 720 relative to other structures in the viewing environment.

The size and shape of a 3D viewing zone can be manipulated using a variety of techniques. For example, as depicted in 7D, manipulator arrows 750 for the three dimensions may appear. A user can click and drag the manipulator arrows 750 to manipulate the viewing zone 720 in the corresponding dimension. Alternatively, the zone management device 170 can infer the desired dimension of motion. An example technique is to project the motion of the mouse onto the three dimensional axes, and move along the dimension with the smallest angle relative to the motion of the mouse.

Another example technique computes the two major axes given the orientation of the camera, and only allows the user to manipulate the viewing zone along the two major axes.

The ability to manipulate the depiction of the viewing environment and viewing zones in the UI 510 of the zone management device 170 provides a solution to the technical problem of managing viewing zones in a 3D viewing environment. In a 3D viewing environment, it may be desirable to have different viewing zones at varying distances from the MV display 150, even if those viewing zones overlap such that a single beamlet projected from the MV display 150 may pass through multiple viewing zones at different distances. If the UI display of the viewing environment and viewing zones is from a fixed perspective, viewing zones may overlap and block viewing zones positioned farther away. As a result, it can be challenging for the user to identify and select the more distant viewing zone. In accordance with embodiments of the present invention, the UI of the zone management device enables the user to manipulate the visualization in the 2D display of the UI 510 of a 3D viewing environment. This enables the user to more easily create, manipulate, and assign content to viewing zones in any location within the viewing environment.

In accordance with embodiments of the present invention, the viewing zones may be generated automatically by the system 100 or may be generated algorithmically based on user defined criteria. For example, in the 2D representation 350 illustrated in FIG. 3D, the system 100 may utilize image recognition software to process the image taken by the 2D camera and detect features in the image that could be used to automatically generate an array of one or more viewing zones without user intervention. In one embodiment, the system 100 may be configured to detect a horizontal line of chairs or people in a theater and identify that line as a row 322-1. The system 100 may then automatically generate a first viewing zone 320-1 encompassing that row 322-1. The system 100 may then detect a second horizontal line of chairs or people, identify that line as a second row 322-1, and generate a second viewing zone 320-2 encompassing the second row 322-1.

In some embodiments, the viewing zones may be generated algorithmically based on user defined criteria. For example, in a theater, a user may utilize a UI of the zone management device to define a large region 330, e.g., encompassing the entire seating area of a theater. The user may then enter criteria for algorithmically dividing that region 330 into multiple viewing zones. This criteria could be, for example, to generate a new viewing zone boundaries separated a prescribed distance (e.g., linear or angular) in the y-direction within that region 330. In yet other embodiments, the user criteria for generating viewing zones could be to evenly divide the region 330 into a prescribed number of rows and columns. The algorithmic generation of viewing zones could be particularly useful when establishing viewing zones in a regular pattern, such as for an array of seats in a theater.

Figure 3E:
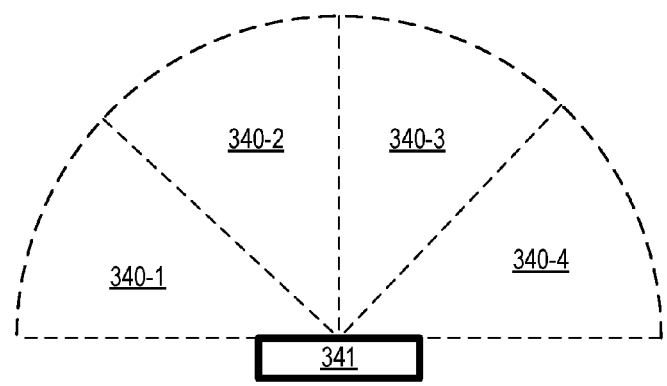
FIG. 3E illustrates viewing zone generation in accordance with embodiments of the present invention.

In some embodiments, viewing zones may be established without displaying a visual representation of the viewing environment on the zone management device. An MV display may be used in certain applications in which the configuration of the viewing environment is not relevant. FIG. 3E illustrates an example in which the viewing zones 340-1 to 340-4 are automatically generated based on the angular relationship with the MV display 341. In this example, the MV display 341 is an emergency sign that directs people to the closest exit based on their angular position relative to the sign. The user can then enter the viewing zone generation criteria (e.g., generate a new viewing zone at 45° increments) into the UI of the zone management device, even though the UI need not display any type of representation of the viewing environment.

Viewing Zone Groups.

As described above, viewing zones can be assigned into viewing zone groups, such that all viewing zones within a viewing zone group share certain characteristics, e.g., they are assigned the same content for display. FIG. 8 depicts an example UI 810 for assigning content to viewing zone groups. In this example, 18 different viewing zones 820 are shown, with nine of the viewing zones 820-2 being assigned to Viewing Zone Group 2. The remaining viewing zones 820-1 may be assigned to a different viewing zone group or may not be assigned to any viewing zone group, so that content is individually assigned to those viewing zones 820-1. Viewing zone groups can be selected by selecting a member of the group, and a visual indicator of the members of the selected viewing zone group may be provided (e.g., by specialized corner markers). Different viewing zone groups can be differentiated by a variety of methods including, but not limited to, different line colors, fill colors, fill patterns, shadings, line widths, and/or line styles. Individual viewing zones can be reassigned to a different existing viewing zone group, a new viewing zone group, or no viewing zone group. Viewing zone groups can also be organized in a hierarchy.

The use of viewing zone groups can enable users to more easily manage viewing zones, particularly when the viewing environment contains a large number of viewing zones. In some situations, it may be desirable for several viewing zones to see the same content on the MV display 150. If all of those viewing zones are assigned to the viewing zone group, the user need only assign the content for display to the viewing zone group and that assignment would automatically propagate to all members of that viewing zone group. In other situations, it may be desirable to provide differentiated content to the viewing zones in a viewing zone group, in which case that content can be assigned individually and rules generated for when each viewing zone will be shown the individually assigned content and the zone group content. One example in which this may be particularly useful is when the viewing environment is a theater, auditorium, or other venue containing a large number of seats in fixed locations. Each seat may be assigned its own unique viewing zone and also assigned to a viewing zone group. When different presentations are being made in those venues, the viewing zone group assignments can be easily changed to accommodate the content to be shown to the audience.

In other embodiments, fixed viewing zone group assignments need not be permanently assigned by the user of the zone management device 170 and instead may be variable based on input from the viewers during a performance of presentation. For example, during a performance, the audience members may be prompted to provide an input, such as, e.g., in response to a question. This input may be received, e.g., on user input devices provided at each seat or from an application running on the audience members' smartphones. Each audience member may then be assigned to a viewing zone group based on that input. In one example, each audience member may select the movie they wish to view and all of the viewing zones containing the audience members who selected a particular movie would be assigned to the same viewing zone group. The content for display to that viewing zone group would be the selected movie. In other embodiments, the viewing zone group assignments may be made based on known characteristics of the viewers located in the viewing zones. For example, the seating assignments and selection of the movie to be shown to the viewer in each seat may be made in advance. Each viewing zone corresponding to the assigned seat of those viewers can be assigned to the viewing zone group corresponding to that movie.

User Interface with a Pre-Existing Model of the Viewing Environment.

As described above, the zone management device 170 may present a pre-existing model of the viewing environment on the device's display. For example, the UI could present a theater seating chart to a theater operator. As another example, the model of a city could be displayed for a city planner. In yet another example, a model of a theme park attraction area could be shown for a theme park designer. The pre-existing model can be 2D or 3D. Using previously described techniques, a MV display can be calibrated to the pre-existing model.

The viewing zone dimensional information stored and manipulated by the user with the UI may be measured in the dimensions of the pre-existing model. For example, if a model of a city were measured in meters and the MV display were calibrated to the model of the city, the viewing zone dimensional information can be stored in meters, or a distance unit readily convertible to meters.

User Interface with Sensed Model of the Viewing Environment.

As described above, in other embodiments, the UI of the zone management device 170 may present a model of the viewing environment as estimated by the sensing system 154. Examples of suitable sensing systems 154 include, but are not limited to, 2D cameras, depth sensors, time-of-flight cameras and/or stereoscopic cameras.

As shown in FIG. 2, the zone management device 170 may communicate with the sensing system 154 (either directly or via the system controller 152) to retrieve estimated models of the viewing environment. Using previously described techniques, the MV display 150 can be calibrated to the coordinate system of the sensing system 154.

In some embodiments, the model of the viewing environment can be continuously retrieved and updated in real-time. This allows a user to manipulate viewing zones in the context of the current viewing environment. Alternatively, a snapshot model of the viewing environment can be retrieved on command. This can be done to reduce the processing power needed to retrieve and render real-time models, increasing the responsiveness of the interface.

The viewing zone dimensional information stored and manipulated by the zone management device 170 may be measured in the dimensions of the sensing system coordinate system. For example, if the viewing environment is represented by images captured by a 2D camera, the viewing zone information can be stored in 2D camera pixel units. In another example, if the viewing environment is represented by depth maps captured by a stereoscopic camera, the viewing zone information can be stored in the coordinate system of the depth map.

Adapting Content Based on Environmental Conditions.

In accordance with embodiments of the present invention, the content to be displayed on the MV display may be variable based on environmental conditions. The sensing system 154 (or other sensing mechanism) may be used to detect one or more characteristics of the viewing environment. The visual content to be displayed to the viewing zones may be selected or modified based on the detected characteristics. These sensors can send signals and/or data to the system controller 152, which can allow a user to consider the environmental conditions of viewing zones in assigning content or automatically adapt the content assigned to each viewing zone. For example, a light sensor may be used to detect the ambient light, and the brightness of the content displayed on the MV display may be automatically adapted to accommodate those changes. The light sensor may detect the ambient light in a general area (e.g., the entire viewing environment) and adjust the brightness of the content displayed on the MV display to all viewing zones in that general area. Alternatively, the light sensor may detect the ambient in a particular area and adjust the brightness of content displayed on the MV display to only the viewing zone contained in that particular area. In other embodiments, regions of the viewing environment representing transitions from a first condition to a second condition may be used for generating viewing zones and/or assigning content. For example, in a viewing environment containing a first region with high ambient light levels and a second region with low ambient light levels, it may be desirable for the content displayed to the first region to be displayed at a high brightness level to accommodate viewers in that first region whose eyes have adjusted to the bright environment, and for the content displayed to the second region to be displayed at a low brightness level to accommodate viewers in that second region whose eyes have dilated to adjust to the dim environment. In addition, it may be desirable to define a third transition region between the first and second regions where it can be expected that viewers are moving between the first and second regions so that their eyes are in the process of adjusting to the transition. In this case, the third region may be configured to display content at a medium brightness level.

The environmental conditions may also be used to assist users in creating viewing zones for certain conditions. For example, light sensors might detect ambient light throughout the viewing environment, allowing a user to lay out viewing zones for distinct lighting conditions, and to design content suited to the lighting within each viewing zone. A blindingly bright viewing zone may be assigned different content than a dimly lit viewing zone. In another example, sensors may detect the location of wet spots on the floor, and the multi-view display can show warnings towards viewing environments with wet spots.

In some embodiments, the MV system 100 may communicate with other systems that control environmental conditions. For example, the system controller 152 may communicate with a facility's lighting system, so adjustments may be made by a user to the ambient lighting itself to coordinate with the layout and content assignment of viewing zones. The facility lighting and MV display may be configured together to optimize lighting and content visibility.

In some embodiments, the UI of the zone management device 170 can indicate characteristics of the viewing zones to aid the user by displaying representations of those characteristics. Characteristics of each viewing zone might be conveyed by the graphical representations of the viewing zones or on a menu or other listing of the viewing zones. In the example of light sensors, as each viewing zone is created, the average light and/or range of light within that zone might be indicated in one of a variety of ways including, but not limited to, a number, label, shading on the graphic, and/or color coding. Other examples of conditions that may affect the design or selection of content include, but are not limited to, the average or range of distances from the MV display to points in the viewing zone, angle of view, a number of viewers in the first viewing zone, an environmental context of the first viewing zone, activity levels of people in the first viewing zone, and/or the presence of obstructions. In some cases, these conditions may be detected with sensors, while in other cases, these conditions may be based on geometry calculated by the MV system 100. In some embodiments, data may be retrieved from tables, charts, or other data repositories that document changing conditions within a viewing environment. In some embodiments, representations of known or sensed conditions in the viewing environment may be displayed by the UI of the zone management device. For example, in a viewing environment containing both grass and pavement, representations indicating the presence of grass and/or pavement may be displayed by the UI.

Other examples of sensors and systems may be used in conjunction with the management of viewing zones include, but are not limited to, weather sensors, timers, clocks, people counters, boarding pass readers, smart phone interfaces, airline schedules, smoke detectors, landscape sprinkling networks, and/or databases. As an example, the zone management device 170 may permit the user to designate different content to display on the MV display 150 based on possible weather readings from a weather sensor. As a result, under a first weather condition (e.g., sunshine), the MV display 150 will display a first visual content to a viewing zone, and under a second weather condition (e.g., rain), the MV display 150 will display a second visual content to the viewing zone.

Dynamically Changing Viewing Zones and/or Content.

The zone management device 170 may allow a user to design and visualize changes in viewing zones and/or assigned content. For example, a scavenger hunt may involve guests finding the viewing zone with a clue at a particular time. Using the zone management device 170, the user can specify viewing zones and timing parameters, or schedule a series of movements of viewing zones. The UI of the zone management device 170 can show a manipulatable timeline of the schedule events, and visualize the events as an animation showing how the zones and/or content change over time or in response to specified events.

In yet other embodiments, sensors may detect the presence and number of people in the viewing environment and adjust the content displayed to each viewing zone based on that detection. For example, each time a new person is detected entering a viewing zone, an introductory video may be shown to that viewing zone.

For all the embodiments presented here, the term "display" may describe a single display, multiple displays, an array of displays, arrangements of displays, or even a single projection source (element or pixel), without limitation. In this disclosure, the term "display" is used interchangeably with such terms and concepts as signs, signage, signals, monitors, pixel arrays, strings of pixels, and may also refer to the use of multiple displays in various configurations. The embodiments presented here are meant as examples, and do not exclude alternative embodiments or combinations that fall within the spirit and scope of the present inventions.

Embodiments of the present invention may provide numerous advantages. Although MV displays can serve as a powerful tool for delivering content to viewers, the mechanism for assigning the differentiated content to be displayed on the MV display may be burdensome and time consuming. A user interface that enables a content designer to manipulate a visualization of the viewing environment when creating viewing zones and assigning content to be displayed to those viewing zone can significantly ease that burden.

While the invention has been described in terms of particular embodiments and illustrative figures, those of ordinary skill in the art will recognize that the invention is not limited to the embodiments or figures described. For example, in various embodiments described above, the MV display is provided in a theater for a theatrical performance. In other embodiments, the MV display can be provided in any desired location, either indoors or outdoors, and for any type of presentation or event. In addition, although FIG. 1 depicts the administrator 160 inside of the viewing environment while operating the zone management device 170, the user of the zone management device 170 may be located anywhere and the viewing environment need not be that user's direct view. The UI of the zone management device 170 can enable the user to effectively manage the viewing zones and content without having to actually view the environment directly.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show details of the invention in more detail than is necessary for the fundamental understanding of the invention, the description taken with the drawings, and/or examples making apparent to those skilled in the art how the several forms of the invention may be embodied in practice.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

Specific elements of any embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of assigning content for display by a multi-view display in a three-dimensional space, the method comprising:
   displaying on a user interface of a computing device a representation of the three-dimensional space;
   providing at least one of: a zone management tool on the user interface for configuring a plurality of unique viewing zones in the three-dimensional space, or a content assignment tool on the user interface for assigning visual content for display in each of the plurality of viewing zones;

displaying on the multi-view display a first visual content visible to a first viewer positioned in a first viewing zone of the plurality of viewing zones, but not visible to a second viewer positioned in a second viewing zone of the plurality of viewing zones; and displaying on the multi-view display a second visual content visible to the second viewer positioned in the second viewing zone, but not visible to the first viewer positioned in the first viewing zone.

2. The method of claim 1, further comprising:
displaying on the user interface the first viewing zone;
receiving a first user input via the content assignment tool to assign the first visual content for display in the first viewing zone;
displaying on the user interface the second viewing zone; and
receiving a second user input via the content assignment tool to assign the second visual content for display in the second viewing zone.

3. The method of claim 2, further comprising:
receiving a third user input via the content assignment tool to assign a third visual content for display in the first viewing zone and a condition for display of the third visual content; and
detection of the condition for display of the third visual content; and
displaying on the multi-view display the third visual content visible to the first viewer positioned in the first viewing zone, but not visible to the second viewer positioned in the second viewing zone.

4. The method of claim 1, wherein, the method further comprising:
providing a perspective management tool on the user interface for manipulating a point of view depicted in the representation of the three-dimensional space;
receiving a first user input via the perspective management tool to change the point of view of the representation of the three-dimensional space;
displaying a second representation of the three-dimensional space corresponding to the point of view changed by the first user input.

5. The method of claim 1, further comprising:
receiving a first user input via the zone management tool to create the first viewing zone in the three-dimensional space;
receiving a second user input via the zone management tool to adjust a boundary of the second viewing zone in the three-dimensional space;
receiving a third user input via the content assignment tool to assign the first visual content for display in the first viewing zone;
receiving a fourth user input via the content assignment tool to assign the second visual content for display in the second viewing zone;
displaying on the multi-view display the first visual content visible to the first viewer positioned in the first viewing zone, but not visible to the second viewer positioned in the second viewing zone; and
displaying on the multi-view display the second visual content visible to the second viewer positioned in the second viewing zone, but not visible to the first viewer positioned in the first viewing zone.

6. The method of claim 1, further comprising:
providing the zone management tool on the user interface for configuring the plurality of unique viewing zones by receiving user inputs to perform one or more of the following tasks: creating a new viewing zone; deleting an existing viewing zone; resizing an existing viewing zone; moving an existing viewing zone; copying an existing viewing zone; pasting a copied viewing zone; rotating an existing viewing zone; reshaping an existing viewing zone; replicating an existing viewing zone in a predetermined pattern; selecting an existing viewing zone; creating an array of viewing zones, and adding conditions to an existing viewing zone.

7. The method of claim 1, wherein providing the zone management tool on the user interface for configuring the plurality of unique viewing zones comprises:
displaying on the user interface of the computing device a first outline of the first viewing zone and a second outline of the second viewing zone superimposed on the representation of the three-dimensional space.

8. The method of claim 7, wherein providing the zone management tool on the user interface for configuring the plurality of unique viewing zones comprises:
displaying on the user interface of the computing device a representation of the first visual content within the first outline of the first viewing zone; and
displaying on the user interface of the computing device a representation of the second visual content within the second outline of the second viewing zone superimposed on the representation of the three-dimensional space.

9. The method of claim 1, further comprising:
displaying on the user interface of the computing device a representation of a first characteristic of the first viewing zone.

10. The method of claim 9, wherein:
the displaying on the user interface of the computing device the representation of the first characteristic of the first viewing zone comprises displaying on the user interface of the computing device the representation of one or more of the following characteristics: a lighting condition of the first viewing zone, a distance from the multi-view display to a location in the first viewing zone, a number of viewers in the first viewing zone, an environmental context of the first viewing zone, activity levels of people in the first viewing zone, or an obstruction between the multi-view display and the first viewing zone.

11. The method of claim 1, further comprising:
receiving a user selection of the first viewing zone;
receiving via the content assignment tool a character-based content for the first viewing zone; and
displaying on the multi-view display the character-based content visible to the first viewer positioned in the first viewing zone.

12. The method of claim 1, further comprising:
receiving a user selection of the first viewing zone;
receiving via the content assignment tool a first content reference for the first viewing zone; and
retrieving first visual content corresponding to the first content reference from a first content source; and
displaying on the multi-view display the first visual content, wherein the first visual content is visible to the first viewer positioned in the first viewing zone.

13. The method of claim 12, wherein:
retrieving first visual content corresponding to the first content reference comprises retrieving a media stream from the first content source; and
displaying on the multi-view display the media stream, wherein the media stream is visible to the first viewer positioned in the first viewing zone.

14. The method of claim 1, wherein:
receiving a selection of at least two viewing zones of the plurality of viewing zones for inclusion in a first viewing zone group;
receiving a first user input via the content assignment tool to assign the first visual content for display in the at least two viewing zones of the first viewing zone group; and
displaying on the multi-view display the first visual content visible to viewers positioned in each of the at least two viewing zones of the first viewing zone group.

15. The method of claim 1, wherein:
utilizing a sensing system to detect one or more characteristics of the three-dimensional space.

16. The method of claim 1, further comprising:
utilizing the sensing system to generate a representation of the three-dimensional space.

17. The method of claim 15, further comprising:
determining the first visual content based at least in part on one or more of the detected characteristics of the three-dimensional space.

18. The method of claim 17, wherein the determining the first visual content based at least in part on one or more of the detected characteristics of the three-dimensional space comprises:
determining a distance to the first viewing zone; and
selecting a size of the first visual content based at least in part on the distance to the first viewing zone.

19. The method of claim 15, further comprising:
detecting with the sensing system a change in a first characteristic of the first viewing zone;
modifying the first visual content based at least in part on the detected change in the first characteristic of the first viewing zone; and
displaying on the multi-view display the modified first visual content visible to the first viewer positioned in the first viewing zone, but not visible to the second viewer positioned in the second viewing zone.

20. The method of claim 19, wherein:
the detecting with the sensing system the change in the first characteristic of the first viewing zone comprises detecting with the sensing system a change in a lighting condition of the first viewing zone; and
the modifying the first visual content based at least in part on the detected change in the first characteristic of the first viewing zone comprises modifying a brightness of the first visual content based at least in part on the detected change in the lighting condition of the first viewing zone.

21. A computing device, comprising:
a processor; and
a non-transitory computer-readable memory storing computer-executable instructions which when executed cause the processor to perform a method comprising:
displaying on a user interface of a computing device a representation of a three-dimensional space;
providing a zone management tool on the user interface for configuring a plurality of unique viewing zones in the three-dimensional space;
providing a content assignment tool on the user interface for assigning visual content for display in each of the plurality of viewing zones;
displaying on the multi-view display a first visual content visible to a first viewer positioned in a first viewing zone of the plurality of viewing zones, but not visible to a second viewer positioned in a second viewing zone of the plurality of viewing zones; and
displaying on the multi-view display a second visual content visible to the second viewer positioned in the second viewing zone, but not visible to the first viewer positioned in the first viewing zone.

* * * * *